(12) United States Patent
Xue et al.

(10) Patent No.: US 12,356,287 B2
(45) Date of Patent: Jul. 8, 2025

(54) BLUETOOTH-BASED OBJECT SEARCHING METHOD AND ELECTRONIC DEVICE

(71) Applicant: HUAWEI TECHNOLOGIES CO., LTD., Guangdong (CN)

(72) Inventors: Qingfeng Xue, Xi'an (CN); Jiachen Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 738 days.

(21) Appl. No.: 17/622,414

(22) PCT Filed: Jun. 28, 2020

(86) PCT No.: PCT/CN2020/098354
§ 371 (c)(1),
(2) Date: Dec. 23, 2021

(87) PCT Pub. No.: WO2020/259649
PCT Pub. Date: Dec. 30, 2020

(65) Prior Publication Data
US 2022/0360942 A1 Nov. 10, 2022

(30) Foreign Application Priority Data
Jun. 28, 2019 (CN) .......................... 201910580431.2

(51) Int. Cl.
*H04W 4/029* (2018.01)
*G08B 21/24* (2006.01)
(Continued)

(52) U.S. Cl.
CPC ............. *H04W 4/029* (2018.02); *H04W 4/80* (2018.02); *H04W 8/005* (2013.01); *G08B 21/24* (2013.01)

(58) Field of Classification Search
CPC ....... H04W 4/029; H04W 4/80; H04W 8/005; H04W 48/16; H04W 64/00; H04W 84/18;
(Continued)

(56) References Cited

U.S. PATENT DOCUMENTS

2013/0324098 A1 12/2013 Piemonte et al.
2016/0381510 A1* 12/2016 Reynolds .............. H04W 4/026
455/456.1
(Continued)

FOREIGN PATENT DOCUMENTS

CN 103745578 A 4/2014
CN 103841514 A 6/2014
(Continued)

OTHER PUBLICATIONS

S. -. Lee and Y. -. Lee, "Adaptive frequency hopping for bluetooth robust to WLAN interference," in IEEE Communications Letters, vol. 13, No. 9, pp. 628-630, Sep. 2009, doi: 10.1109/LCOMM. 2009.090115.
(Continued)

*Primary Examiner* — Yuwen Pan
*Assistant Examiner* — Fatuma G Sherif
(74) *Attorney, Agent, or Firm* — WOMBLE BOND DICKINSON (US) LLP

(57) ABSTRACT

A server receives a search request that includes a first location and an identifier of a Bluetooth device and that is sent by a first terminal; within a first time period, determines at least one second terminal by using a first frequency and a first density in a first search range, and sends a search task that carries the identifier to the at least one second terminal; if the server does not receive, within the first time period, a message that is fed back by any one of the at least one second terminal and that indicates that the Bluetooth device is found, within a second time period after the first time (Continued)

period, determines at least one third terminal by using a second frequency and a second density in a second search range, and sends the search task that carries the identifier to the at least one third terminal.

20 Claims, 22 Drawing Sheets

(51) Int. Cl.
*H04W 4/80* (2018.01)
*H04W 8/00* (2009.01)

(58) Field of Classification Search
CPC ........ H04W 4/02; H04W 76/14; G08B 21/24; Y02D 30/70
See application file for complete search history.

(56) References Cited

U.S. PATENT DOCUMENTS

2017/0055112 A1   2/2017   Westphal et al.
2019/0191473 A1*  6/2019   Zhang .................. H04W 76/14

FOREIGN PATENT DOCUMENTS

| | | |
|---|---|---|
| CN | 104066055 A | 9/2014 |
| CN | 104464132 A | 3/2015 |
| CN | 105072577 A | 11/2015 |
| CN | 105303791 A | 2/2016 |
| CN | 105323845 A | 2/2016 |
| CN | 105516916 A | 4/2016 |
| CN | 106023540 A | 10/2016 |
| CN | 106981170 A | 7/2017 |
| CN | 107241432 A | 10/2017 |
| CN | 108268908 A | 7/2018 |
| CN | 108391229 A | 8/2018 |
| CN | 108419206 A | 8/2018 |
| CN | 110460981 A | 11/2019 |
| EP | 2608097 A1 | 6/2013 |

OTHER PUBLICATIONS

Li Yuchao, Design of Searching and Data Recycling System Based on Unmanned Aerial Vehicle, North Central University, 2017, 2 pages (abstract).

* cited by examiner

BLUETOOTH-BASED OBJECT SEARCHING METHOD AND ELECTRONIC DEVICE

This application is a national stage of International Application No. PCT/CN2020/098354, filed on Jun. 28, 2020, which claims priority to Chinese Patent Application No. 201910580431.2, filed on Jun. 28, 2019. Both of the aforementioned applications are hereby incorporated by reference in their entireties.

TECHNICAL FIELD

This application relates to the field of communications technologies, and in particular, to a Bluetooth-based object searching method and an electronic device.

BACKGROUND

In daily life, a user often loses an object. For a relatively important object such as a wallet or a key, the user can quickly find a target object by using an anti-loss device. The anti-loss device is a small Bluetooth device. When the user uses the Bluetooth device, the user binds the Bluetooth device to a mobile phone, and the mobile phone records an identifier (for example, a media access control address (MAC address)) of the Bluetooth device and establishes a Bluetooth connection to the Bluetooth device. In addition, the user may use, for example, an elastic rope, to fasten the Bluetooth device and an anti-loss target object together. In this way, when a distance between the target object (that is, the Bluetooth device) and the mobile phone is greater than a threshold, the mobile phone alarms the user.

When the user loses the target object, the mobile phone reports a location of the mobile phone at which the mobile phone disconnects from the Bluetooth device to a server. The server determines a search range based on the reported location of the mobile phone, and invokes another mobile phone in the search range to perform Bluetooth signal scanning, so as to assist in searching for the Bluetooth device (the target object).

It may be noted that, as a search task proceeds, the server determines that the search range may have been thoroughly searched. Continuing to search the search range may be completely meaningless and cause a resource waste.

SUMMARY

This application provides a Bluetooth-based object searching method and an electronic device, to improve a probability of finding a target object, and reduce search resources.

According to a first aspect, a method provided in this application is applied to a server. The server receives a search request sent by a first terminal, where the search request includes a first location and an identifier of a Bluetooth device, and the first location is a location at which the first terminal loses a Bluetooth connection to the Bluetooth device, or the first location is a location entered by a user by using the first terminal; within a first time period, the server determines at least one second terminal by using a first frequency and a first density in a first search range determined based on the first location, and sends a search task that carries the identifier to the at least one second terminal, so that the at least one second terminal enables Bluetooth to search for the Bluetooth device; and if the server receives a message that is fed back by any one of the at least one second terminal and that indicates that the Bluetooth device is found, the server sends a second location of the second terminal that finds the Bluetooth device to the first terminal; or if the server does not receive, within the first time period, a message that is fed back by any one of the at least one second terminal and that indicates that the Bluetooth device is found, within a second time period after the first time period, the server determines at least one third terminal by using a second frequency and a second density in a second search range, and sends the search task that carries the identifier to the at least one third terminal, so that the at least one third terminal enables Bluetooth to search for the Bluetooth device. The second search range is determined by the server based on the first location, the second search range is different from the first search range, the second frequency is less than the first frequency, and the second density is less than the first density.

It can be learned that, in this application, the server dynamically adjusts a search range based on duration of the search task. This can prevent an invalid search from being repeatedly performed after a same search range is thoroughly searched, and further improve a probability of finding a target object. The server dynamically adjusts a search density, a search frequency, search duration, and the like based on the duration of the search task, and may dynamically adjust a terminal that performs the search task. This can prevent a plurality of terminals from repeatedly searching a same search range, and prevent a terminal resource waste.

In an embodiment, the first search range is circular coverage that is determined by the server and whose center is the first location and radius is a first distance, or rectangular coverage that is determined by the server and whose center is the first location and side length is a distance twice the first distance; and the second search range is circular coverage that is determined by the server and whose center is the first location and radius is a second distance, or rectangular coverage that is determined by the server and whose center is the first location and side length is a distance twice the second distance. The second distance is greater than the first distance.

Because the user just loses the target object, in other words, when the first terminal just publishes the search request, that the first location reported by the first terminal is a location at which the target object is lost has relatively high credibility. Therefore, it may be determined that the search range is near the first location. As a search process proceeds, an original search range has been searched. Therefore, the search range can be expanded by stages. This prevents a search resource waste.

In an embodiment, the first density is a quantity of first search cells determined by the server in unit area coverage, the first search cell is used to determine the at least one second terminal, the second density is a quantity of second search cells determined by the server in unit area coverage, and the second search cell is used to determine the at least one third terminal. An area of the second search cell is greater than an area of the first search cell. The first density is greater than the second density.

It can be learned that, as a search time elapses, a manner of reducing a search density can be used to reduce terminal resources used for searching, so as to reduce the terminal resources.

In an embodiment, duration of the second time period is greater than duration of the first time period.

In an embodiment, the server sends the search task to the at least one second terminal through transparent message transmission. In sending the search task to the at least one third terminal, the server sends the search task to the at least one third terminal through transparent message transmission.

The transparent message transmission means that, when the server sends the search task to another terminal, a system service of the another terminal does not process the search task, but directly transparently transmits the search task to the first application, and the first application performs processing. In some embodiments, when receiving the search task, the another terminal may directly send the search task to a Bluetooth scanning process in the first application for processing. It can be understood that, even if the another terminal does not start the Bluetooth scanning process (for example, does not run the first application) when receiving the search task, the search task may also enable the terminal to automatically start the Bluetooth scanning process, in other words, to start to perform the search task.

It can be learned that, in this application, a terminal whose search app is offline may be invoked to participate in the search task. This greatly increases a quantity of terminals that perform the search task, and improves a probability of finding a target object.

In an embodiment, the at least one second terminal includes one or more second terminals that register a first service by using a first application but do not run the first application, where the first service is performing the search task sent by the server; and the at least one third terminal includes one or more third terminals that register the first service by using the first application but do not run the first application.

For example, the first service is a search service, and may include a location reporting process and a Bluetooth scanning process. The location reporting process may always run in the background of a terminal that registers the first service, and report one location to the server at an interval of a specific time period (for example, 5 minutes or 10 minutes). In other words, the server stores a real-time location of each terminal that registers the search service. Therefore, after receiving the search request, the server may determine, according to a staged search strategy, a terminal to which the search task is to be sent.

In an embodiment, before the server determines the at least one second terminal by using the first frequency and the first density in the first search range determined based on the first location, the server receives a location reported by the at least one second terminal; or before the server determines the at least one third terminal by using the second frequency and the second density in the second search range within the second time period, the server receives a location reported by the at least one third terminal.

In an embodiment, if a quantity of second terminals determined by the server by using the first frequency and the first density in the first search range is less than a threshold, the server prolongs the duration of the first time period.

It can be learned that, when a quantity of second terminals that participate in the search task is relatively small, the first time period may be prolonged, so that the search range is thoroughly searched, and a probability of finding a target object is improved.

In an embodiment, in determining at least one second terminal by using a first frequency and a first density in the first search range, and sending a search task to the at least one second terminal, the server determines, based on the first search range and the first density, a plurality of first search cells included in the first search range; and the server determines a preset quantity of second terminals from each first search cell based on the first frequency, and sends the search task to the determined second terminal.

In an embodiment, the server receives configuration information sent by the first terminal, where the configuration information is used by the server to configure the first search range, the first frequency, the first density, the duration of the first time period, the second search range, the second frequency, the second density, and the duration of the second time period.

A value of each parameter in each stage of search strategy may be set by the server by default, or may be set by the user of the first terminal, or may be a value automatically learned by the server based on a historical search process, or the like. This is not specifically limited in this embodiment of this application. This can meet user requirements in different scenarios.

According to a second aspect, a server is provided, including one or more processors and one or more memories. The one or more memories are configured to store computer program code, the computer program code includes computer instructions, and when the one or more processors read the computer instructions from the one or more memories, the server is enabled to perform the following operations: receiving a search request sent by a first terminal, where the search request includes a first location and an identifier of a Bluetooth device, and the first location is a location at which the first terminal loses a Bluetooth connection to the Bluetooth device, or the first location is a location entered by a user by using the first terminal; within a first time period, determining at least one second terminal by using a first frequency and a first density in a first search range determined based on the first location, and sending a search task that carries the identifier to the at least one second terminal, so that the at least one second terminal enables Bluetooth to search for the Bluetooth device; and if the server receives a message that is fed back by any one of the at least one second terminal and that indicates that the Bluetooth device is found, sending a second location of the second terminal that finds the Bluetooth device to the first terminal; or if the server does not receive, within the first time period, a message that is fed back by any one of the at least one second terminal and that indicates that the Bluetooth device is found, within a second time period after the first time period, determining at least one third terminal by using a second frequency and a second density in a second search range, and sending the search task that carries the identifier to the at least one third terminal, so that the at least one third terminal enables Bluetooth to search for the Bluetooth device. The second search range is determined by the server based on the first location, the second search range is different from the first search range, the second frequency is less than the first frequency, and the second density is less than the first density.

In an embodiment, the first search range is circular coverage that is determined by the server and whose center is the first location and radius is a first distance, or rectangular coverage that is determined by the server and whose center is the first location and side length is a distance twice the first distance; and the second search range is circular coverage that is determined by the server and whose center is the first location and radius is a second distance, or rectangular coverage that is determined by the server and whose center is the first location and side length is a distance twice the second distance. The second distance is greater than the first distance.

In an embodiment, the first density is a quantity of first search cells determined by the server in unit area coverage, the first search cell is used to determine the at least one second terminal, the second density is a quantity of second search cells determined by the server in unit area coverage, and the second search cell is used to determine the at least one third terminal. An area of the second search cell is greater than an area of the first search cell.

In an embodiment, duration of the second time period is greater than duration of the first time period.

In an embodiment, the server sends the search task to the at least one second terminal through transparent message transmission. The server sends the search task to the at least one third terminal through transparent message transmission.

In an embodiment, the at least one second terminal includes one or more second terminals that register a first service by using a first application but do not run the first application, where the first service is performing the search task sent by the server; and the at least one third terminal includes one or more third terminals that register the first service by using the first application but do not run the first application.

In an embodiment, when the one or more processors read the computer instructions from the one or more memories, the server is further enabled to perform the following operations: before the server determines the at least one second terminal by using the first frequency and the first density in the first search range determined based on the first location, receiving a location reported by the at least one second terminal; and before the server determines the at least one third terminal by using the second frequency and the second density in the second search range within the second time period, receiving a location reported by the at least one third terminal.

In an embodiment, when the one or more processors read the computer instructions from the one or more memories, the server is further enabled to perform the following operation: if a quantity of second terminals determined by the server by using the first frequency and the first density in the first search range is less than a threshold, prolonging the duration of the first time period.

In an embodiment, in determining at least one second terminal by using a first frequency and a first density in the first search range, and sending a search task to the at least one second terminal, the server determines, based on the first search range and the first density, a plurality of search cells included in the first search range; and the server determines a preset quantity of second terminals from each search cell based on the first frequency, and sends the search task to the determined second terminal.

In an embodiment, when the one or more processors read the computer instructions from the one or more memories, the server is further enabled to perform the following operation: receiving configuration information sent by the first terminal, where the configuration information is used by the server to configure the first search range, the first frequency, the first density, the duration of the first time period, the second search range, the second frequency, the second density, and the duration of the second time period.

According to a third aspect, a computer storage medium is provided, including computer instructions. When the computer instructions are run on a terminal, the terminal is enabled to perform the method according to any one of the first aspect and the possible implementations of the first aspect.

According to a fourth aspect, a computer program product is provided. When the computer program product runs on a computer, the computer is enabled to perform the method according to any one of the first aspect and the possible implementations of the first aspect.

According to a fifth aspect, a chip is provided, including a processor. When the processor executes instructions, the processor performs the method according to any one of the first aspect and the possible implementations of the first aspect.

According to a sixth aspect, an apparatus is provided. The apparatus is included in a server. The apparatus has functions of implementing behavior of the server in the method according to any one of the foregoing aspects and the possible embodiments. The functions may be implemented by hardware, or may be implemented by hardware executing corresponding software. The hardware or the software includes at least one module or unit corresponding to the functions, for example, a receiving module or unit, a determining module or unit, and a sending module or unit.

According to a seventh aspect, a communications system is provided, including the server according to any one of the second aspect and the possible implementations of the second aspect, a first terminal, one or more second terminals, and one or more third terminals.

DESCRIPTION OF EMBODIMENTS

The following describes the technical solutions in the embodiments of this application with reference to the accompanying drawings in the embodiments of this application. In the descriptions of the embodiments of this application, unless otherwise specified, "I" means "or". For example, A/B may represent A or B. In this specification, "and/or" describes only an association relationship between associated objects and represents that three relationships may exist. For example, A and/or B may represent the following three cases: Only A exists, both A and B exist, and only B exists.

The following terms "first" and "second" are merely intended for a purpose of descriptions, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise specified, "a plurality of" means two or more.

In the embodiments of this application, the word "example" or "for example" is used to represent giving an example, an illustration, or a description. Any embodiment or design solution described as an "example" or "for example" in the embodiments of this application should not be explained as being more preferred or having more advantages than another embodiment or design solution. Exactly, use of the word "example" or "for example" is intended to present a relative concept in a specific manner.

Figure 1:
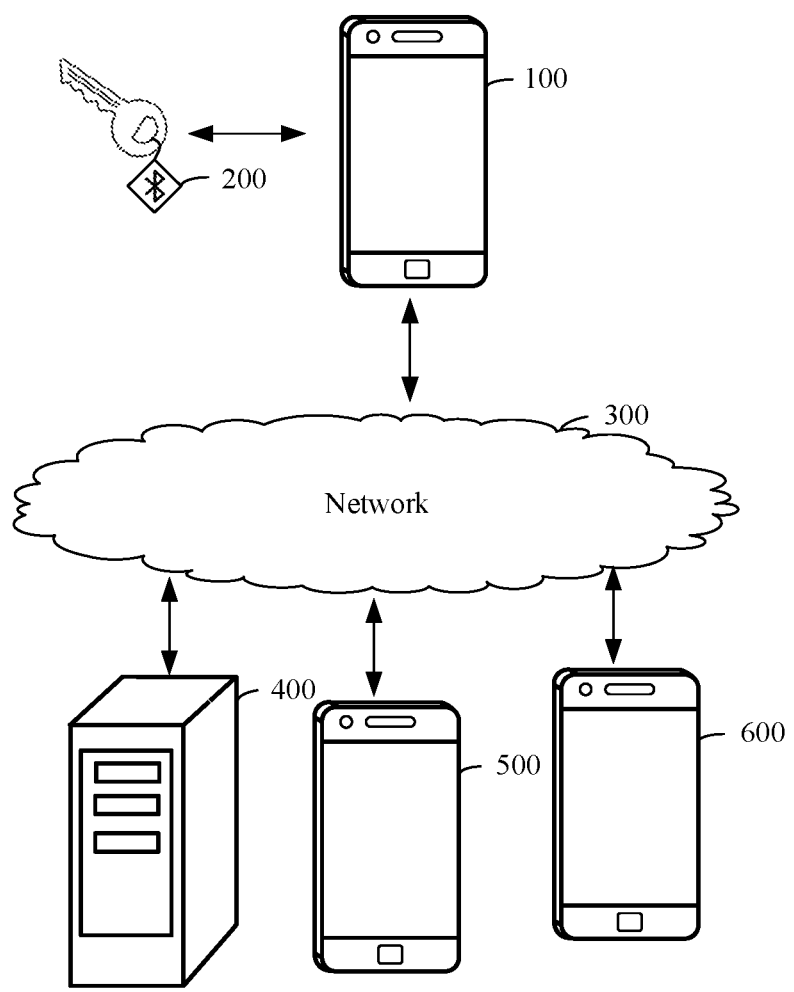
FIG. 1 is a schematic diagram of a structure of a communications system according to an embodiment of this application.

FIG. 1 is a schematic diagram of a structure of a communications system according to an embodiment of this application. The communications system includes a terminal 100 and a Bluetooth device 200. The Bluetooth device 200 is bound to an anti-loss object (which is also referred to as a target object, such as a key, a wallet, a satchel, a removable hard disk, a USB flash drive, a USB key, a bus card, luggage, an anti-loss pet, an aged person, or a child). In this way, a location of the Bluetooth device 200 may be considered as a location of the target object. In other words, in an embodiment of this application, the location of the target object may be found by searching for the location of the Bluetooth device 200.

Specifically, the Bluetooth device 200 establishes a communication connection to the terminal 100, and the communication connection may be, for example, a Bluetooth connection, NFC, ZigBee (ZigBee), or wireless fidelity (wireless fidelity, Wi-Fi).

In some embodiments, the Bluetooth device 200 establishes a Bluetooth connection to the terminal 100. In an example, when the terminal 100 detects that a distance between the terminal 100 and the Bluetooth device 200 is greater than a threshold, the terminal 100 may alarm a user. In an embodiment, the terminal 100 may alternatively indicate the Bluetooth device 200 to give an alarm, for example, play an alarm tone, so that the user can quickly find the Bluetooth device 200 based on the alarm tone. In another example, the user may search for the Bluetooth device 200 by using the terminal 100. For example, the terminal 100 may send an instruction to the Bluetooth device 200 in response to a user operation (for example, tapping a specific control), to instruct the Bluetooth device 200 to give an alarm, so that the user quickly finds the Bluetooth device 200. In still another example, the user may alternatively select the terminal 100 by using the Bluetooth device 200. For example, the Bluetooth device 200 may send an instruction to the terminal 100 in response to a user operation (for example, pressing a specific physical button), to instruct the terminal 100 to play a sound, so that the user quickly finds the terminal 100.

In addition, the terminal 100 may establish, by using a first application installed on the terminal 100, a communication connection to an application server 400 corresponding to the first application. The first application may be an application (which may also be referred to as a search application or a search app) that provides a search service for the terminal 100, for example, may be a "Bluetooth anti-loss device" application. In an embodiment, when the terminal 100 is disconnected from the Bluetooth device 200, the terminal 100 may send a search request (that is, a loss statement) to the application server 400 by using the first application, and the application server 400 sends a search task to another terminal, to assist the terminal 100 in searching for the Bluetooth device 200. In some embodiments, the terminal 100 may also register a search service with the application server 400 by using the first application. In other words, the terminal 100 may participate in a search task delivered by the application server 400, to assist another terminal in searching for another Bluetooth device. The first application may be downloaded by the user from an application market by using the terminal 100, or may be an application that is preset in the terminal 100. This is not specifically limited in this embodiment of this application. For other content of the first application, refer to the following descriptions.

The application server 400 may provide the terminal 100 with a service of searching for the Bluetooth device 200. For example, the application server 400 receives the search request of the terminal 100, determines another terminal (for example, a terminal 500 or a terminal 600) that participates in the search task, delivers the search task to the another terminal, receives a search success message fed back by the terminal (for example, the terminal 500) that performs the search task, and sends a location of the terminal (for example, the terminal 500) to the terminal 100.

In an embodiment, the first application on the terminal 100 may establish a connection to the application server 400 through one or more networks 300. The network 300 may be a local area network (LAN), or may be a wide area network (WAN), for example, an internet. The network 300 may be implemented by using any known network communication protocol. The foregoing network communication protocol may be various wired or wireless communication protocols, for example, Ethernet, a universal serial bus (USB), FireWire (FireWire), any cellular network communication protocol (for example, 3G/4G/5G), Bluetooth, wireless fidelity (Wi-Fi), NFC, or any other appropriate communication protocol.

There may be one or more application servers 400. The application server 400 may also establish a connection to another terminal (for example, the terminal 500 or the terminal 600) through the one or more networks 300.

For example, from the perspective of the terminal 100 that actively sends the search request, when the target object is lost, the terminal 100 is disconnected from the Bluetooth device 200, and the user may publish the loss statement. To be specific, the user sends the search request to the application server 400 by operating the first application on the terminal 100. The search request may include information such as an identifier of the Bluetooth device 200 and a location of the terminal 100 at which the terminal 100 is disconnected from the Bluetooth device 200. The application server 400 may determine a staged search strategy based on the location of the terminal. The staged search strategy means that the application server 400 dynamically adjusts a search range, a search density, a search frequency, search duration, and the like based on duration of the search task. Specific implementation of the staged search strategy is described in detail below. Then, the application server 400 determines terminals that conform to the staged search strategy, for example, the terminal 500 and the terminal 600, and sends the search task to the terminals.

In an embodiment of this application, the application server 400 dynamically adjusts the search range based on the duration of the search task. This can prevent an invalid search from being repeatedly performed after a same search range is thoroughly searched, and further improve a probability of finding a target object. The application server dynamically adjusts the search density, the search frequency, the search duration, and the like based on the duration of the search task, and may dynamically adjust a terminal that performs the search task. This can prevent a plurality of terminals from repeatedly searching a same search range, and prevent a terminal resource waste.

From the perspective of the terminal (for example, the terminal 500 or the terminal 600) that receives the search task, the terminal 500 and the terminal 600 pre-register the search service with the application server 400 (for example, install and register the first application). In some examples, the search service may include a location reporting process and a Bluetooth scanning process. The location reporting process may always run in the background of the terminal 500 or the terminal 600, and report one location to the application server 400 at an interval of a specific time period (for example, 5 minutes or 10 minutes). In other words, the application server 400 stores a real-time location of each terminal that registers the search service. Therefore, after receiving the search request, the application server may determine, according to the staged search strategy, a terminal to which the search task is to be sent. In some other examples, the terminal 500 and the terminal 600 may alternatively receive a time of "Do Not Disturb" that is set by the user. In other words, the terminal 500 or the terminal 600 may not report a location to the application server 400 within the time of "Do Not Disturb", in other words, may not participate in the search task. This prevents the user from being disturbed.

After receiving the search task sent by the application server 400, the terminal 500 and the terminal 600 each start to run the Bluetooth scanning process, to be specific, send a Bluetooth broadcast signal to discover whether there is the Bluetooth device 200 nearby. Assuming that the terminal 500 obtains a Bluetooth signal of the Bluetooth device 200 through scanning, it indicates that the Bluetooth device 200 is located near the terminal 500. In this case, the terminal 500 reports the location of the terminal 500 to the application server 400. Then, the application server 400 sends the location of the terminal 500 to the terminal 100.

Subsequently, the user may enable a Bluetooth scanning function of the terminal 100 when arriving at a location near the terminal 500 with the terminal 100. When obtaining the Bluetooth signal of the Bluetooth device 200 through scanning, the terminal 100 establishes a connection to the Bluetooth device 200. The terminal 100 sends an instruction to the Bluetooth device 200 to instruct the Bluetooth device 200 to give an alarm tone. In this way, the user can quickly find the Bluetooth device 200, that is, the target object, based on the alarm tone of the Bluetooth device 200.

In some embodiments, the application server 400 may send the search task to another terminal (for example, the terminal 500 or the terminal 600) through transparent message transmission. The transparent message transmission means that, when the application server 400 sends the search task to another terminal, a system service of the another terminal does not process the search task, but directly transparently transmits the search task to the first application, and the first application performs processing. In some examples, when receiving the search task, the another terminal may directly send the search task to a Bluetooth scanning process in the first application for processing. It can be understood that, even if the another terminal does not start the Bluetooth scanning process (for example, does not run the first application) when receiving the search task, the search task may also enable the terminal to automatically start the Bluetooth scanning process, in other words, to start to perform the search task.

In an embodiment, the application server 400 may include one or more object searching servers and one or more push servers. The object searching server may be configured to: receive a loss statement sent by the terminal 100, determine a staged search strategy to determine a terminal that performs a search task, receive location information reported by another terminal, send the location information to the terminal 100, and the like. The push server may send, through transparent message transmission, the search task to the terminal determined by the object searching server. It can be understood that the object searching server may also undertake all or a part of work of the push server, and the push server may also undertake all or a part of work of the object searching server. In other words, specific division of work between the object searching server and the push server is not limited in this embodiment of this application.

In the conventional technology, the application server 400 can invoke only a terminal that registers a search service and whose search app is online, to perform a search task. A quantity of terminals that register a search service is relatively small, and a quantity of terminals whose search app is online is smaller. Consequently, the application server 400 can invoke a relatively small quantity of terminals. However, in this embodiment of this application, the application server 400 delivers the search task through transparent message transmission, so that a terminal whose search app is offline can be invoked to participate in the search task. This greatly increases a quantity of terminals that perform the search task, and improves a probability of finding a target object.

For example, the terminal 100 in this application may be a mobile phone, a tablet computer, a personal computer (PC), a personal digital assistant (PDA), a smartwatch, a netbook, a wearable electronic device, an augmented reality (AR) device, a virtual reality (VR) device, a vehicle-mounted device, an intelligent vehicle, a smart speaker, or a robot. A specific form of the terminal 100 is not specially limited in this application.

It should be noted that the terminal 500, the terminal 600, and the terminal 100 may be of a same device type or different device types. The terminal 500 and the terminal 600 may be of a same device type or different device types. In addition, for structures of the terminal 500 and the terminal 600, refer to the descriptions of the structure of the terminal 100 in this embodiment of this application. Details are not described again.

Figure 2A:
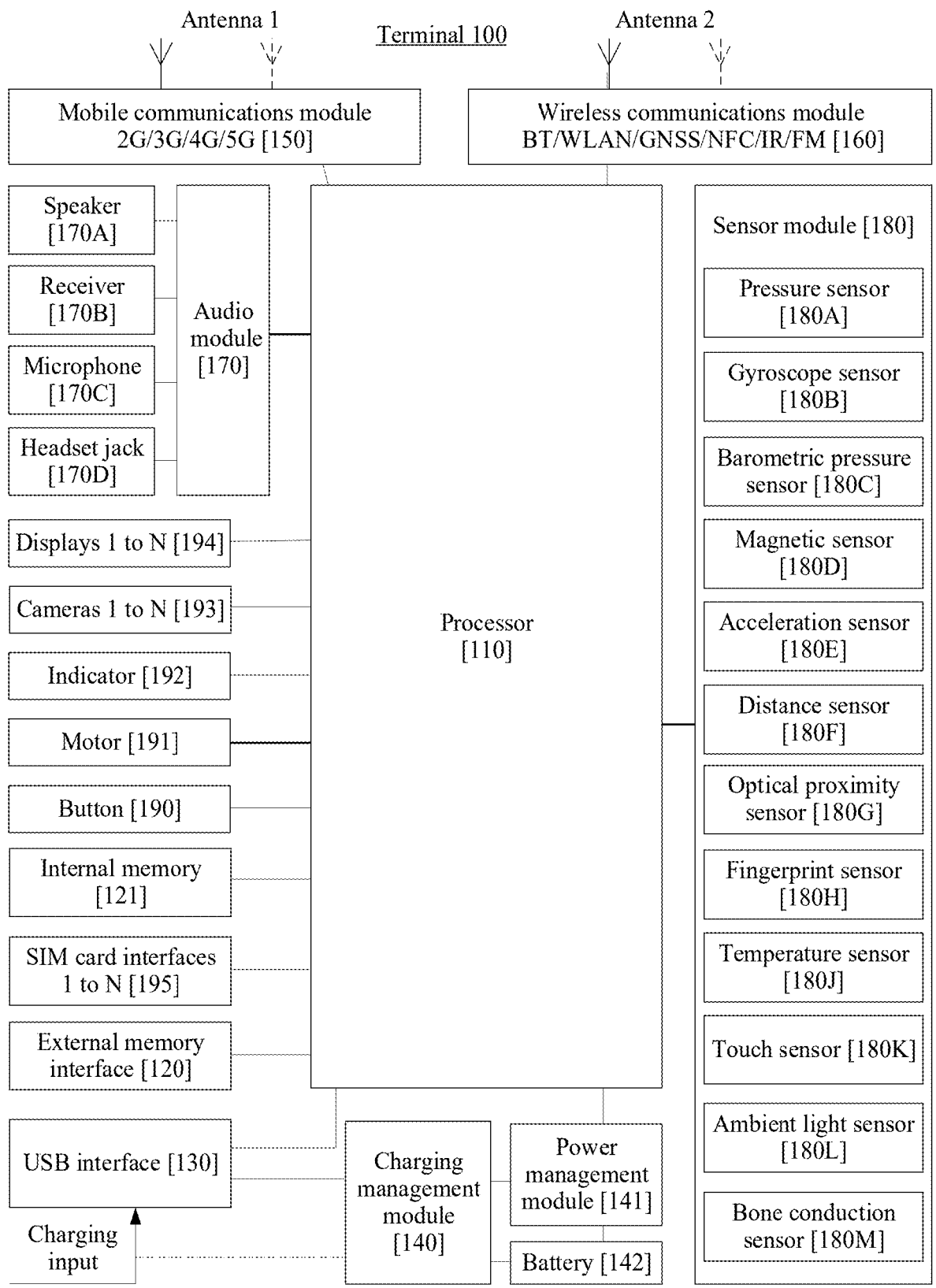
FIG. 2A is a schematic diagram 1 of a structure of a terminal according to an embodiment of this application.

FIG. 2A is a schematic diagram of the structure of the terminal 100.

The terminal 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present application does not constitute a specific limitation on the terminal 100. In some other embodiments of this application, the terminal 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory, to avoid repeated access and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between the modules shown in this embodiment of the present application is merely an example for description, and does not constitute a limitation on the structure of the terminal 100. In some other embodiments of this application, the terminal 100 may alternatively use an interface connection manner different from that in this embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the terminal 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution, applied to the terminal 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 and at least some modules in the processor 110 may be disposed in a same device.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then, the demodulator transmits the low frequency baseband signal obtained through demodulation to the baseband processor for processing. The baseband processor processes the low frequency baseband signal, and then transfers a processed signal to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the terminal 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components that integrate at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

The terminal 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. Therefore, the terminal 100 may play or record videos in a plurality of coding formats, for example, moving picture experts group (MPEG)-1, MPEG-2, MPEG-3, and MPEG-4.

The NPU is a neural network (NN) computing processor that rapidly processes input information by referring to a structure of a biological neural network, for example, by referring to a mode of transmission between human brain neurons, and can further perform self-learning continuously. The NPU can implement applications such as intelligent cognition of the terminal 100, such as image recognition, facial recognition, speech recognition, and text understanding.

The external memory interface 120 may be configured to connect to an external memory card, for example, a micro SD card, to extend a storage capability of the terminal 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications of the terminal 100 and data processing.

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The terminal 100 may be used to listen to music or answer a call in a hands-free mode over the speaker 170A.

The receiver 170B, also referred to as an "earpiece", is configured to convert an audio electrical signal into a sound signal. When a call is answered or a voice message is listened to by using the terminal 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input the sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (CTIA) standard interface.

The button 190 includes a power button, a volume button, and the like. The button 190 may be a mechanical button, or may be a touch button. The terminal 100 may receive a key input, and generate a key signal input related to user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, may be configured to indicate a charging status and a power change, and may also be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with the external storage card. The terminal 100 interacts with a network by using the SIM card, to implement functions such as conversation and data communication. In some embodiments, the terminal 100 uses an eSIM, namely, an embedded SIM card. The eSIM card may be embedded into the terminal 100, and cannot be separated from the terminal 100.

A software system of the terminal 100 may use a layered architecture, an event-driven architecture, a microkernel architecture, a micro service architecture, or a cloud architecture. In an embodiment of the present application, an Android system with a layered architecture is used as an example to describe a software structure of the terminal 100.

Figure 2B:
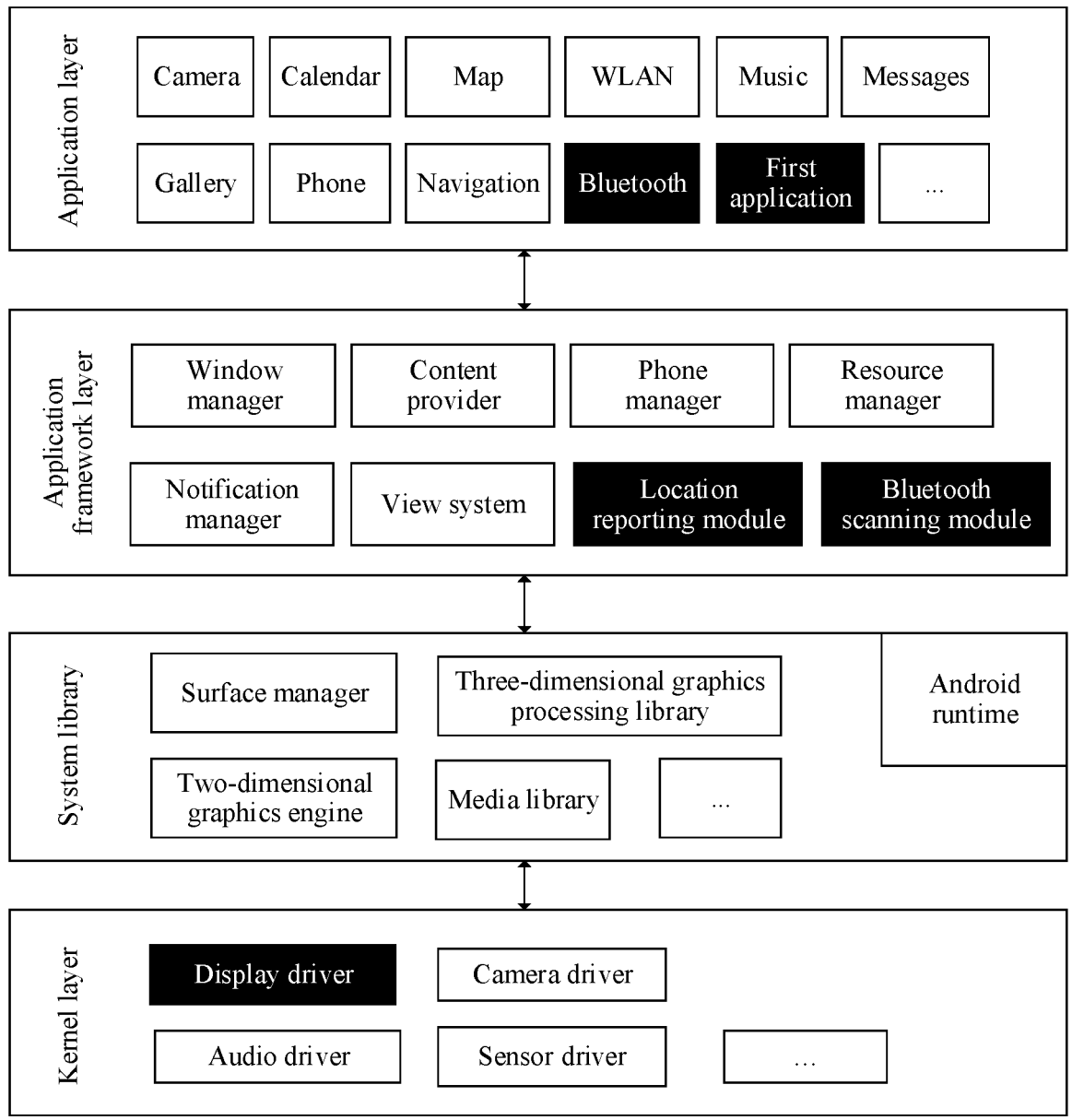
FIG. 2B is a schematic diagram 2 of a structure of a terminal according to an embodiment of this application.

FIG. 2B is a block diagram of a software structure of the terminal 100 according to an embodiment of the present application.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2B, the application packages may include applications such as Camera, Gallery, Calendar, Phone, Map, Navigation, WLAN, Bluetooth, Music, Videos, and Messages.

In some embodiments of this application, the application packages further include a first application (that is, a search app), and the first application may be, for example, a "Bluetooth anti-loss device" application. The first application may provide a graphical user interface on which the terminal 100 interacts with the user. For example, the user may bind the Bluetooth device 200 to the terminal 100 through an interface of the first application, publish a loss statement, find a location at which the Bluetooth device 200 is lost, and the like.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and a bookmark, a phone book, and the like.

The view system includes visual controls, such as a control for displaying a text and a control for displaying an image. The view system may be configured to construct an application. A display interface may include one or more views. For example, a display interface including an SMS message notification icon may include a text display view and a picture display view.

The phone manager is configured to provide a communication function of the terminal 100, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

In some embodiments of this application, the application framework layer may further include a location reporting module and a Bluetooth scanning module. The location reporting module may support the terminal 100 in reporting the location of the terminal 100 to the application server 400 at an interval of a period of time. In some examples, the location reporting module may invoke a positioning system of the system to obtain a real-time location of the terminal 100. The Bluetooth scanning module may support the terminal 100 in performing Bluetooth scanning and the like after the terminal 100 receives the search task sent by the application server 400. In other words, the terminal 100 may also receive the search task delivered by the application server 400, so as to assist in searching for another Bluetooth device.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3A:
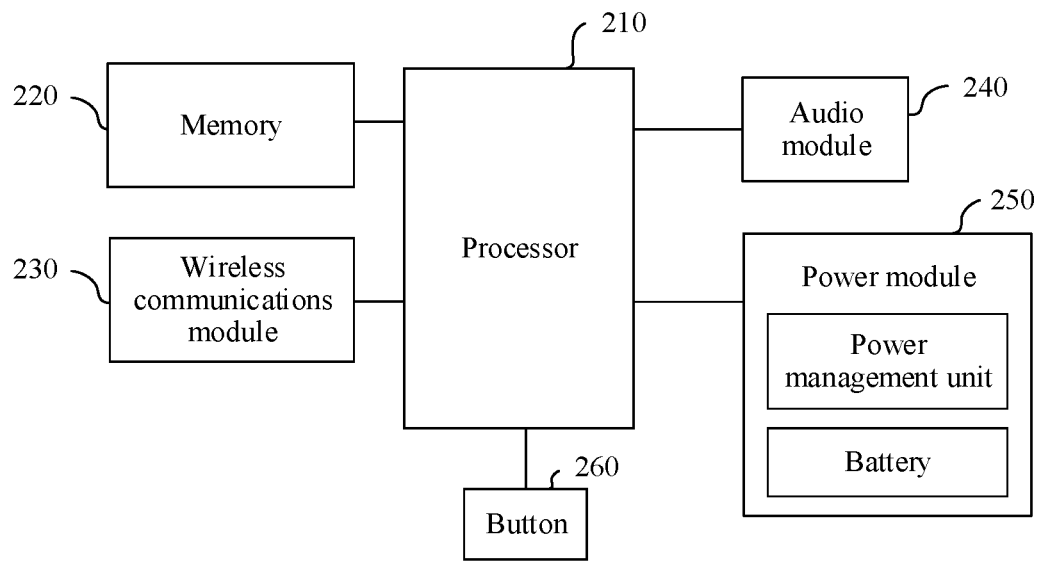
FIG. 3A is a schematic diagram 3 of a structure of a terminal according to an embodiment of this application.

FIG. 3A is a schematic diagram of a structure of the Bluetooth device 200. The Bluetooth device 200 may include at least one processor 210, at least one memory 220, a wireless communications module 230, an audio module 240, a power module 250, and the like. The processor 210 may include one or more interfaces, configured to connect to another component of the Bluetooth device 200.

The memory 220 may be configured to: store program code, for example, program code used to perform wireless pairing and connection between the Bluetooth device 200 and another terminal (for example, the terminal 100); determine a distance between the Bluetooth device 200 and the another terminal based on a Bluetooth signal between the Bluetooth device 200 and the another terminal; and the like.

The processor 210 may be configured to execute the foregoing application program code, and invoke a related module to implement a function of the Bluetooth device 200 in this embodiment of this application. For example, the processor implements a connection between the Bluetooth device 200 and the another terminal (for example, the terminal 100). For another example, the processor 210 determines a distance between the Bluetooth device 200 and the terminal 100 based on a strength of a Bluetooth signal between the Bluetooth device 200 and the terminal 100. When the distance exceeds a threshold, the processor 210 indicates the audio module 240 to give an alarm to prompt the user.

The processor 210 may include one or more processing units. Different processing units may be independent components, or may be integrated into one or more processors 210. The processor 210 may be an integrated control chip, or may include a circuit including various active components and/or passive components, and the circuit is configured to perform a function of the processor 210 that is described in this embodiment of this application.

The wireless communications module 230 may be configured to support data exchange, including wireless communication such as BT, WLAN (for example, Wi-Fi), ZigBee, FM, NFC, IR, or a universal 2.4G/5G wireless communications technology, between the Bluetooth device 200 and the another terminal.

In some embodiments, the wireless communications module 230 may be a Bluetooth chip. The Bluetooth device 200 may be paired with and wirelessly connected to a Bluetooth chip of the another terminal by using the Bluetooth chip, so as to implement wireless communication between the Bluetooth device 200 and the another electronic device and service processing through the wireless connection. Generally, the Bluetooth chip may support basic rate (BR)/enhanced data rate (EDR) Bluetooth and BLE, for example, may receive/send page information and receive/send a BLE broadcast message.

In addition, the wireless communications module 230 may further include an antenna. The wireless communications module 230 receives an electromagnetic wave through the antenna, performs frequency modulation and filtering processing on the electromagnetic wave signal, and sends a processed signal to the processor 210. The wireless communications module 230 may further receive a to-be-sent signal from the processor 210, perform frequency modulation and amplification on the signal, and convert the signal into an electromagnetic wave for radiation through the antenna.

The audio module 240 may be configured to manage audio data, so that the Bluetooth device 200 outputs an audio signal. For example, the audio module 240 may include a speaker component (or referred to as an earpiece or a receiver) configured to output an audio signal, a microphone (or referred to as a mike or a microphone), and a microphone radio circuit cooperating with the microphone. The speaker may be configured to convert an audio electrical signal into a sound signal and play the sound signal. The microphone may be configured to convert a sound signal into an audio electrical signal.

In an embodiment, the audio module 240 may be a buzzer. When receiving an alarm indication from the processor 210, the audio module emits a buzzer to prompt the user.

The power module 250 may be configured to: provide system power for the Bluetooth device 200; supply power to each module of the Bluetooth device 200; support the Bluetooth device 200 in receiving a charging input; and the like. The power module 250 may include a power management unit (PMU) and a battery. The power management unit may receive an external charging input; perform voltage transformation on the charging circuit input and provide a transformed input for the battery for charging; perform voltage transformation on an electrical signal provided by the battery and provide a transformed electrical signal for other modules such as the audio module 240 and the wireless communications module 230; and prevent battery overcharging, over-discharging, short-circuiting, overcurrent, or the like. In some embodiments, the power module 250 may further include a wireless charging coil for wirelessly charging the Bluetooth device 200. In addition, the power management unit may be further configured to monitor parameters such as a battery capacity, a battery cycle count, and a battery health status (electric leakage or impedance).

It can be understood that the structure shown in this embodiment of this application does not constitute a specific limitation on the Bluetooth device 200. The Bluetooth device may have more or fewer components than those shown in FIG. 3A, or combine two or more components, or have different component configurations. For example, an outer surface of the Bluetooth device 200 may further include components such as a button 260, an indicator light (which may indicate a battery level, an incoming/outgoing call, a pairing mode, and the like), a display (which may prompt user-related information), and a dust filter (which may be used in cooperation with the receiver). The button 260 may be a physical button, a touch button (used in cooperation with a touch sensor), or the like, and is configured to trigger operations such as power-on, power-off, pairing, and resetting.

The various components shown in FIG. 3A may be implemented in hardware, software, or a combination of hardware and software including one or more signal processing or application-specific integrated circuits.

Figure 3B:
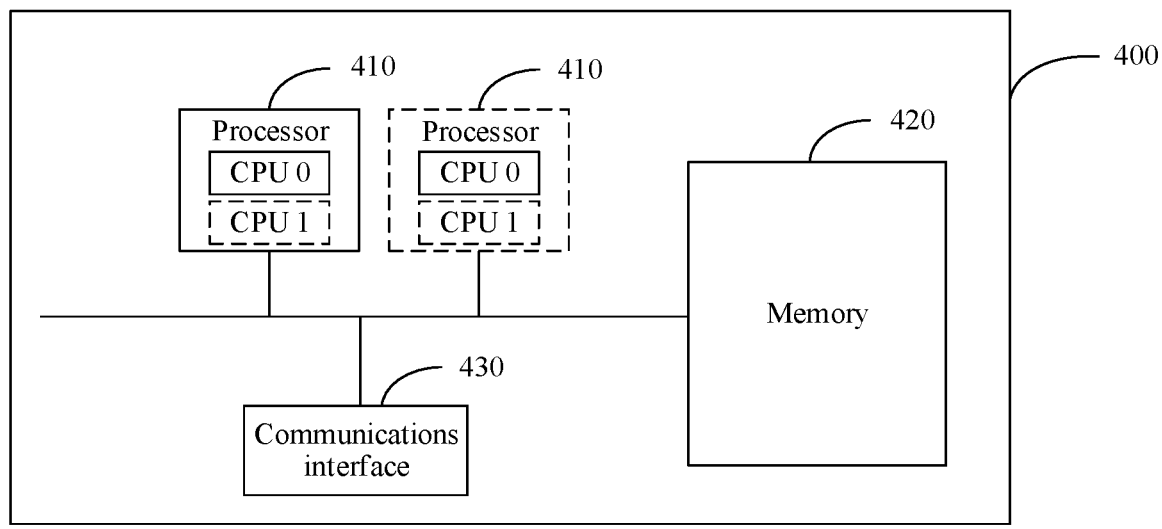
FIG. 3B is a schematic diagram of a structure of a server according to an embodiment of this application.

FIG. 3B is a schematic diagram of a hardware structure of the application server 400. The application server 400 includes at least one processor 410, at least one memory 420, and at least one communications interface 430. Optionally, the application server 400 may further include an output device and an input device that are not shown in the figure.

The processor 410, the memory 420, and the communications interface 430 are connected through a bus. The processor 410 may be a general-purpose central processing unit (CPU), a microprocessor, an application-specific integrated circuit (ASIC), or one or more integrated circuits configured to control program execution in the solutions of this application. The processor 410 may alternatively include a plurality of CPUs, and the processor 410 may be a single-core (single-CPU) processor or a multi-core (multi-CPU) processor. The processor herein may be one or more devices, circuits, or processing cores for processing data (for example, computer program instructions).

In an embodiment of this application, the processor 410 may be configured to determine a staged search strategy based on a search request, for example, determine a search range in each stage of search strategy based on a first location in the search request, determine each stage of search cell based on each stage of search range, and determine, based on each stage of search cell, a terminal that performs a search task.

The memory 420 may be a read-only memory (ROM) or another type of static storage device that can store static information and an instruction, or may be a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile optical disc, a Blu-ray disc, and the like), a magnetic disk storage medium or another magnetic storage device, or any other medium that can carry or store expected program code in a form of an instruction or a data structure and that can be accessed by a computer. This is not limited. The memory 420 may exist independently, and is connected to the processor 410 through a bus. The memory 420 may alternatively be integrated with the processor 410. The memory 420 is configured to store application program code for executing the solutions in this application, and the processor 410 controls the execution. The processor 410 is configured to execute the computer program code stored in the memory 420, to implement a Bluetooth-based object searching method in the embodiments of this application.

In some embodiments of this application, the memory 420 may store a location reported by a terminal that registers a search service, a related parameter in the staged search strategy, and the like.

The communications interface 430 may be configured to communicate with another device or a communications network, such as the Ethernet or a wireless local area network (wireless local area network, WLAN).

In this embodiment of this application, the communications interface 430 may be configured to perform communication between the application server 400 and the terminal 100, the terminal 500, the terminal 600, or the like. For example, the application server 400 may receive, through the communications interface 430, a search request (that is, a loss statement) sent by the terminal 100; receive, through the communications interface 430, locations sent by the terminal 500 and the terminal 600; and push, through the communications interface 430, a search task to a terminal that performs the search task and that is determined by the processor 410.

When communicating with the processor, the output device may display information in a plurality of manners. For example, the output device may be a liquid crystal display (LCD), a light emitting diode (LED) display device, a cathode ray tube (CRT) display device, or a projector. When communicating with the processor, the input device may receive a user input in a plurality of manners. For example, the input device may be a mouse, a keyboard, a touchscreen device, or a sensor device.

All the technical solutions in the following embodiments may be applied to the communications system shown in FIG. 1. The terminal 100 may have the hardware architecture shown in FIG. 2A and the software architecture shown in FIG. 2B. The Bluetooth device 200 may have the hardware architecture shown in FIG. 3A. The application server 400 may have the hardware architecture shown in FIG. 3B.

FIG. 4A to FIG. 6F are schematic diagrams of some graphical user interfaces according to embodiments of this application. The following describes the technical solutions of this application in detail with reference to the accompanying drawings.

1. A first terminal (that is, a terminal 100) is paired with and connected to a Bluetooth anti-loss device (that is, a Bluetooth device 200).

The Bluetooth anti-loss device is physically bound to an anti-loss target object. For example, the Bluetooth anti-loss device and the anti-loss target object may be bound or attached together by using another component (such as an elastic rope or an adhesive material), and a Bluetooth function of the Bluetooth anti-loss device is enabled. Then, a user may perform pairing and connection between the first terminal and the Bluetooth anti-loss device by operating an app on the first terminal.

Figure 4A:
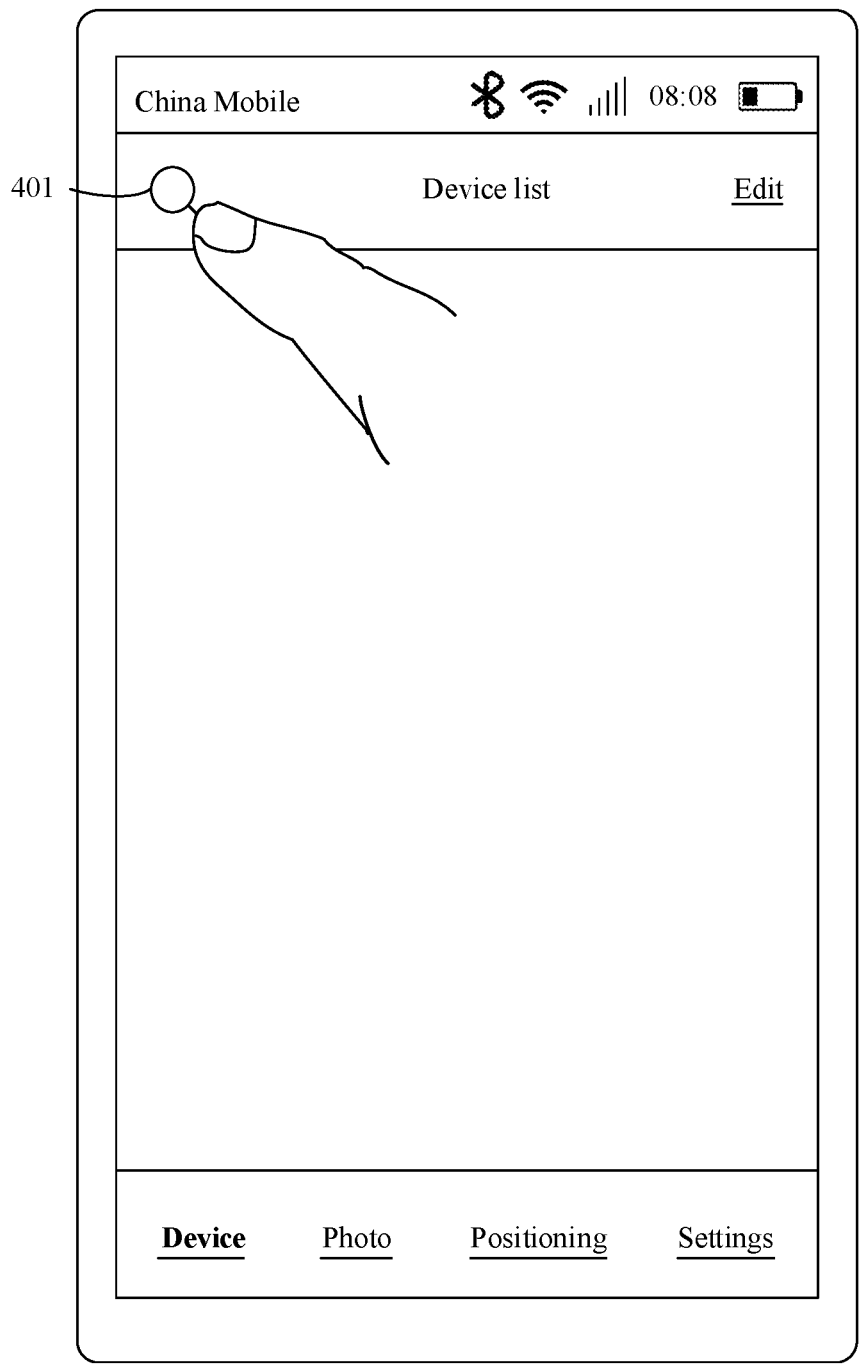
FIG. 4A is a schematic diagram 1 of a user interface of a terminal according to an embodiment of this application.
Figure 4B:
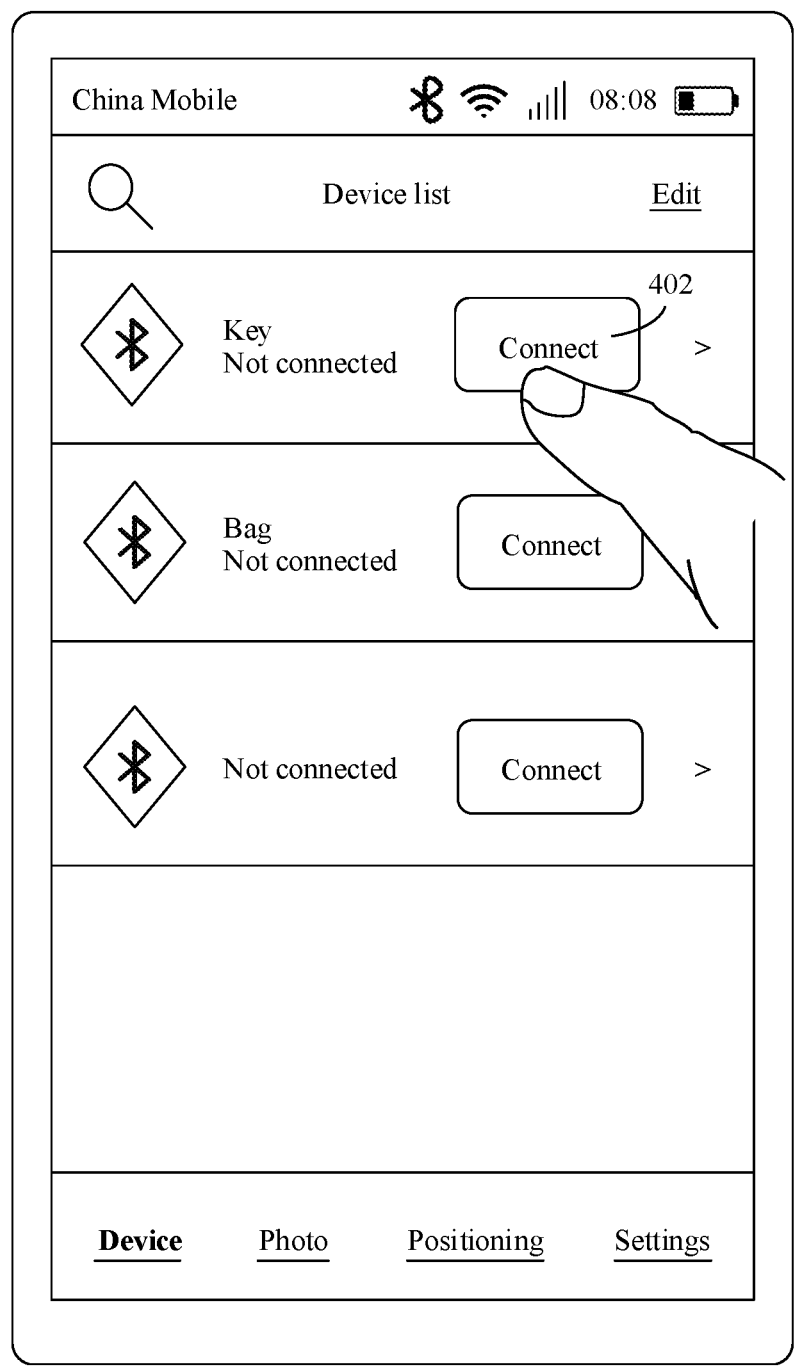
FIG. 4B is a schematic diagram 2 of a user interface of a terminal according to an embodiment of this application.

For example, in response to an operation that the user starts a first application (for example, a "Bluetooth anti-loss device" application), the first terminal (for example, a mobile phone) displays a main interface of the first application. As shown in FIG. 4A, the user may tap a search control 401 to start a Bluetooth scanning process of the first terminal, and start to search for a nearby device that enables a Bluetooth function. As shown in FIG. 4B, when Bluetooth anti-loss devices bound to the target object are obtained through scanning, the user may tap a connection control 402, and the first terminal is paired with and connected to a Bluetooth anti-loss device named "Key". For a specific pairing and connection process, refer to the conventional technology. Details are not described herein again.

Certainly, the user may alternatively enable a Bluetooth scanning function through system settings of the first terminal, to search for a nearby device that enables a Bluetooth function. In addition, the user indicates the first terminal to be paired with and connected to the Bluetooth anti-loss device.

Figure 4C:
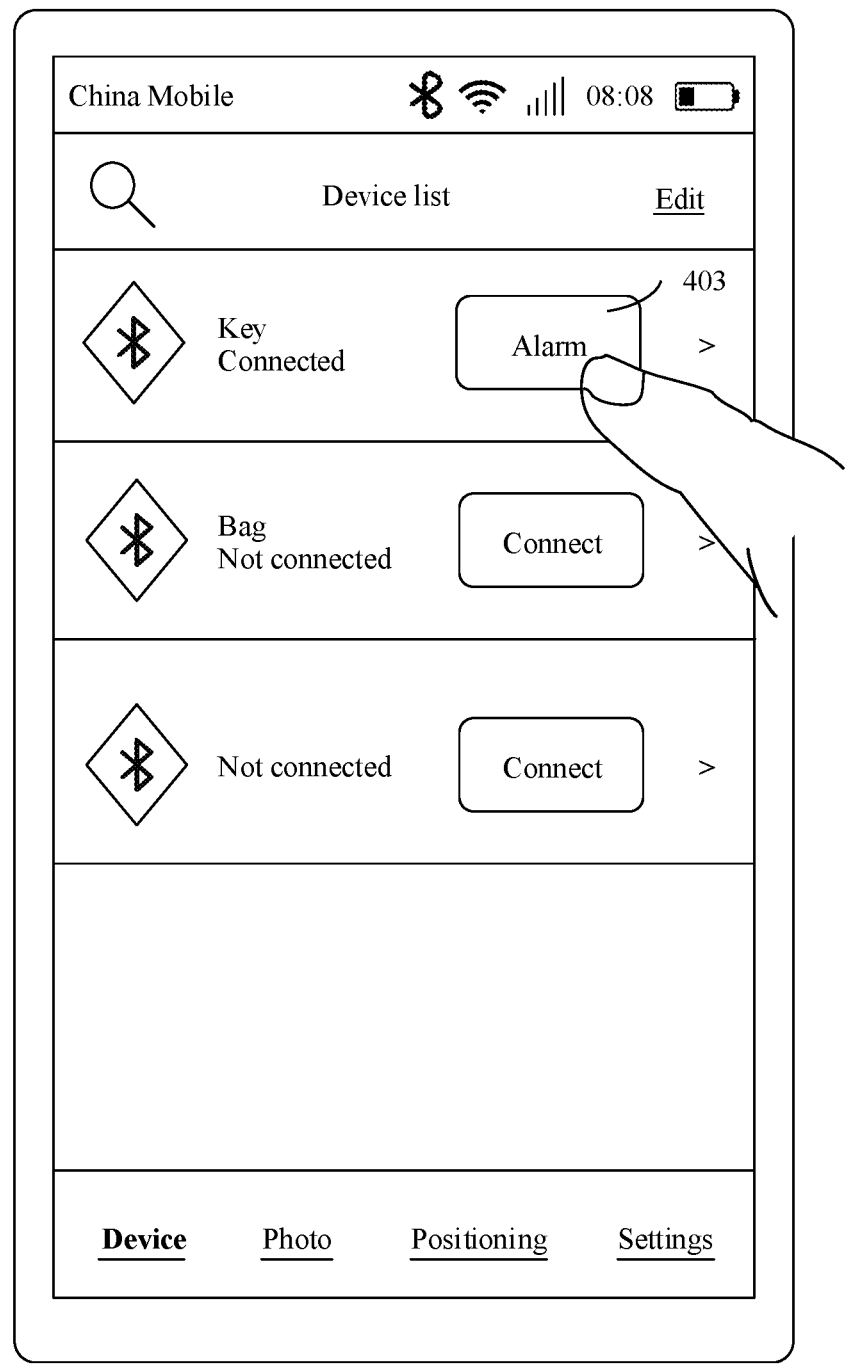
FIG. 4C is a schematic diagram 3 of a user interface of a terminal according to an embodiment of this application.

After the first terminal establishes the connection to the Bluetooth anti-loss device, the user may use the first terminal to manually trigger the Bluetooth anti-loss device to give an alarm. For example, as shown in FIG. 4C, in response to an operation that the user taps an alarm control 403 corresponding to "Key", the first terminal sends an alarm indication to the Bluetooth anti-loss device, and the Bluetooth anti-loss device gives an alarm, for example, gives an alarm tone. In this way, the user can quickly find the Bluetooth anti-loss device, that is, the target object, based on the alarm tone.

In some embodiments of this application, when detecting that a distance between the first terminal and the Bluetooth anti-loss device is greater than a threshold (for example, 20 meters), the first terminal may automatically trigger the Bluetooth anti-loss device to give an alarm. Alternatively, when detecting that the distance between the Bluetooth anti-loss device and the first terminal is greater than the threshold, the Bluetooth anti-loss device may automatically give an alarm. During specific implementation, the first terminal (or the Bluetooth anti-loss device) may calculate the distance between the first terminal and the Bluetooth anti-loss device based on a strength of a Bluetooth signal between the first terminal and the Bluetooth anti-loss device. For a specific calculation method, refer to the conventional technology. Details are not described herein again. Certainly, the first terminal (or the Bluetooth anti-loss device) may alternatively determine the distance between the first terminal and the Bluetooth anti-loss device by using another method. This is not limited in this embodiment of this application.

It can be understood that the foregoing distance threshold may be set by the first terminal by default, or may be set based on a user input. For example, the first terminal may set one threshold for a plurality of Bluetooth anti-loss devices. For example, a threshold for the Bluetooth anti-loss device corresponding to "Key" and a threshold for a Bluetooth anti-loss device corresponding to "Bag" are both set to 10 meters. Alternatively, the first terminal may set different thresholds for different Bluetooth anti-loss devices. For example, the threshold for the Bluetooth anti-loss device corresponding to "Key" is set to 5 meters, and the threshold for the Bluetooth anti-loss device corresponding to "Bag" is set to 10 meters.

Figure 4D:
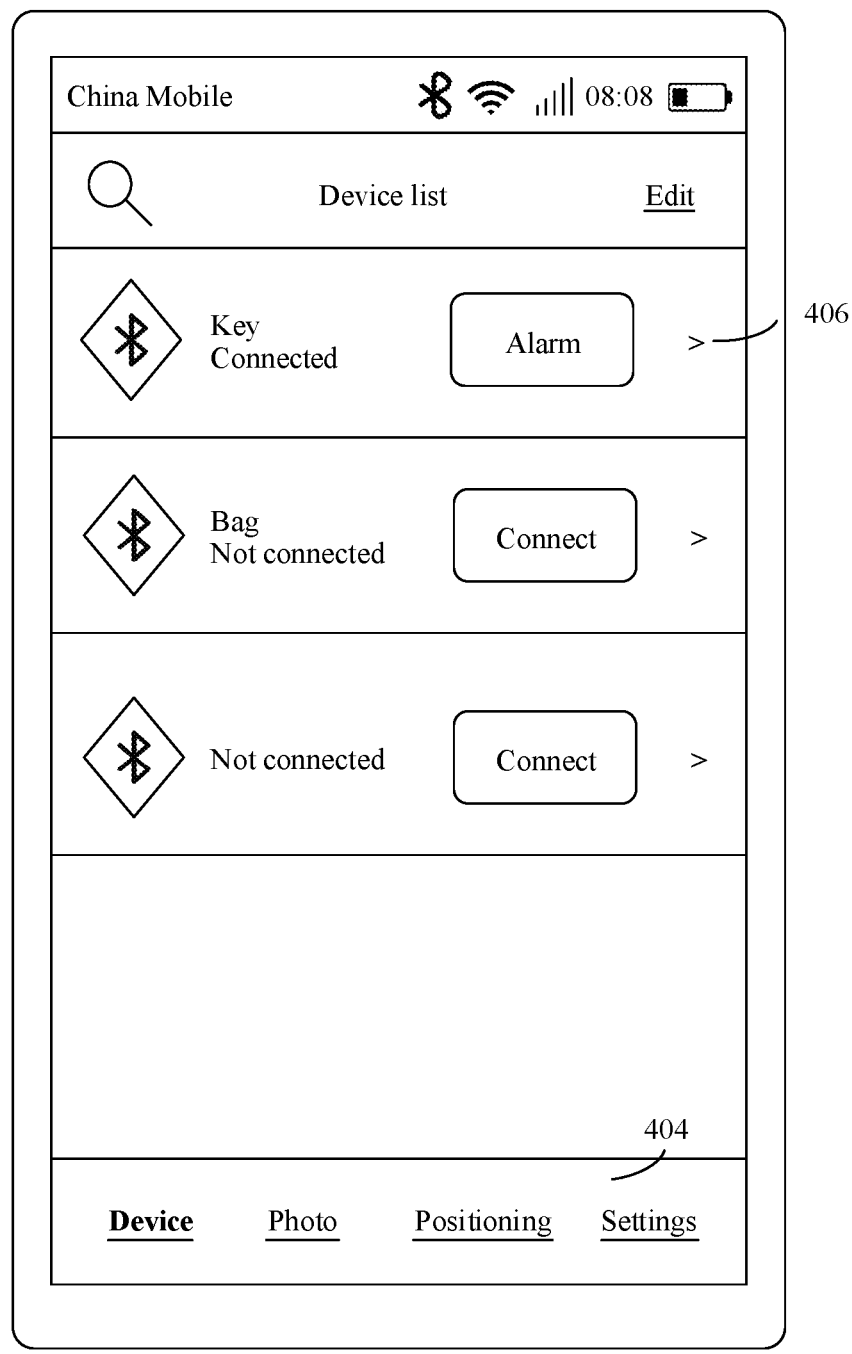
FIG. 4D is a schematic diagram 4 of a user interface of a terminal according to an embodiment of this application.
Figure 4E:
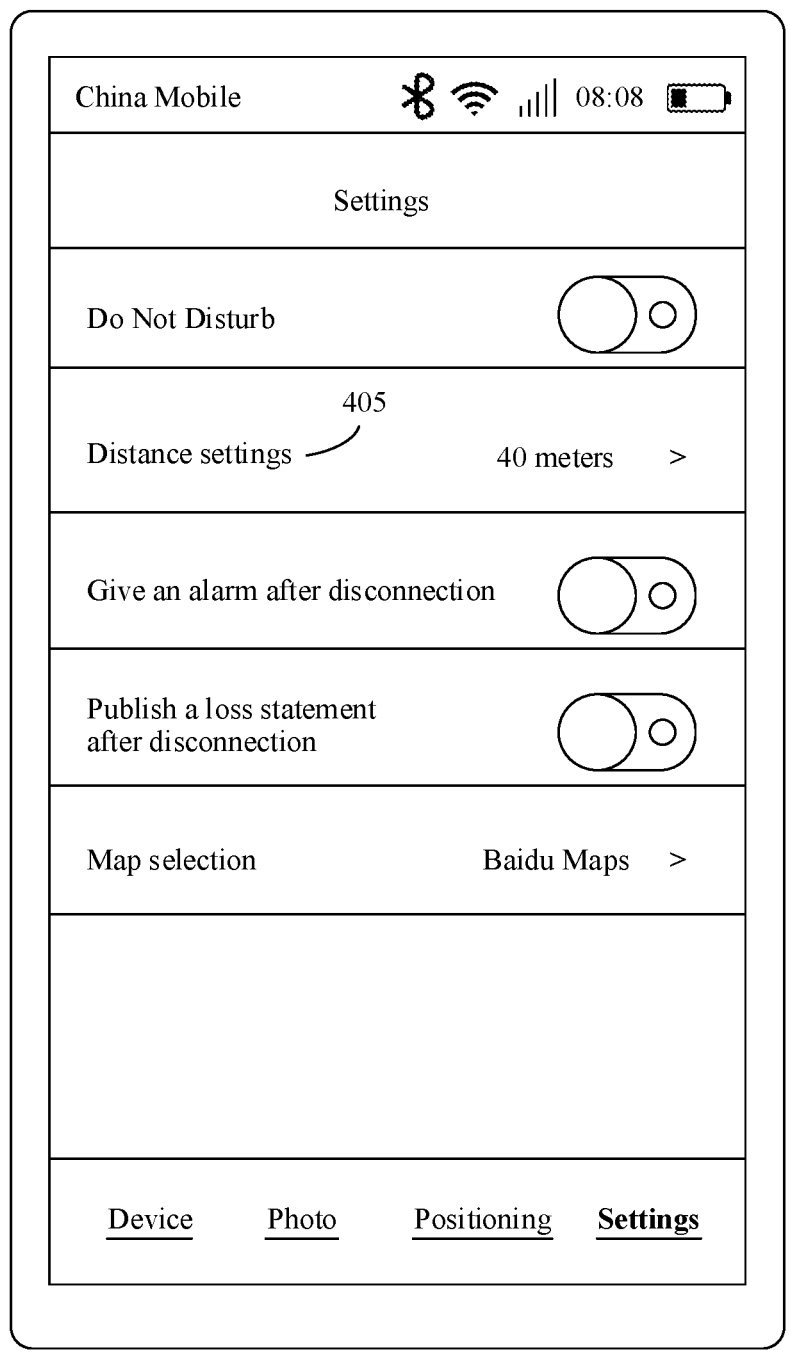
FIG. 4E is a schematic diagram 5 of a user interface of a terminal according to an embodiment of this application.

In an example, as shown in FIG. 4D, the user may tap a setting control 404 to open a setting interface of the first application. As shown in FIG. 4E, the user may set the distance threshold by operating a distance setting option 405. For example, the threshold may be set to any value from 0.5 meters to 50 meters. On the setting interface, other content, for example, whether to enable "Do Not Disturb", whether to automatically give an alarm after disconnection, whether to automatically publish a loss statement after disconnection, a map selected to be used, and a sound, may also be set.

In another example, as shown in FIG. 4D, the user may tap a more control 406 corresponding to "Key", to set the Bluetooth anti-loss device corresponding to "Key". For example, the distance threshold, whether to give an alarm after disconnection, and whether to automatically publish a loss statement after disconnection are set.

2. The first terminal publishes a loss statement to an application server 400.

When detecting that the first terminal is disconnected from the Bluetooth anti-loss device, the first terminal may automatically publish the loss statement, or may display prompt information to prompt the user whether to publish the loss statement.

Figure 5A:
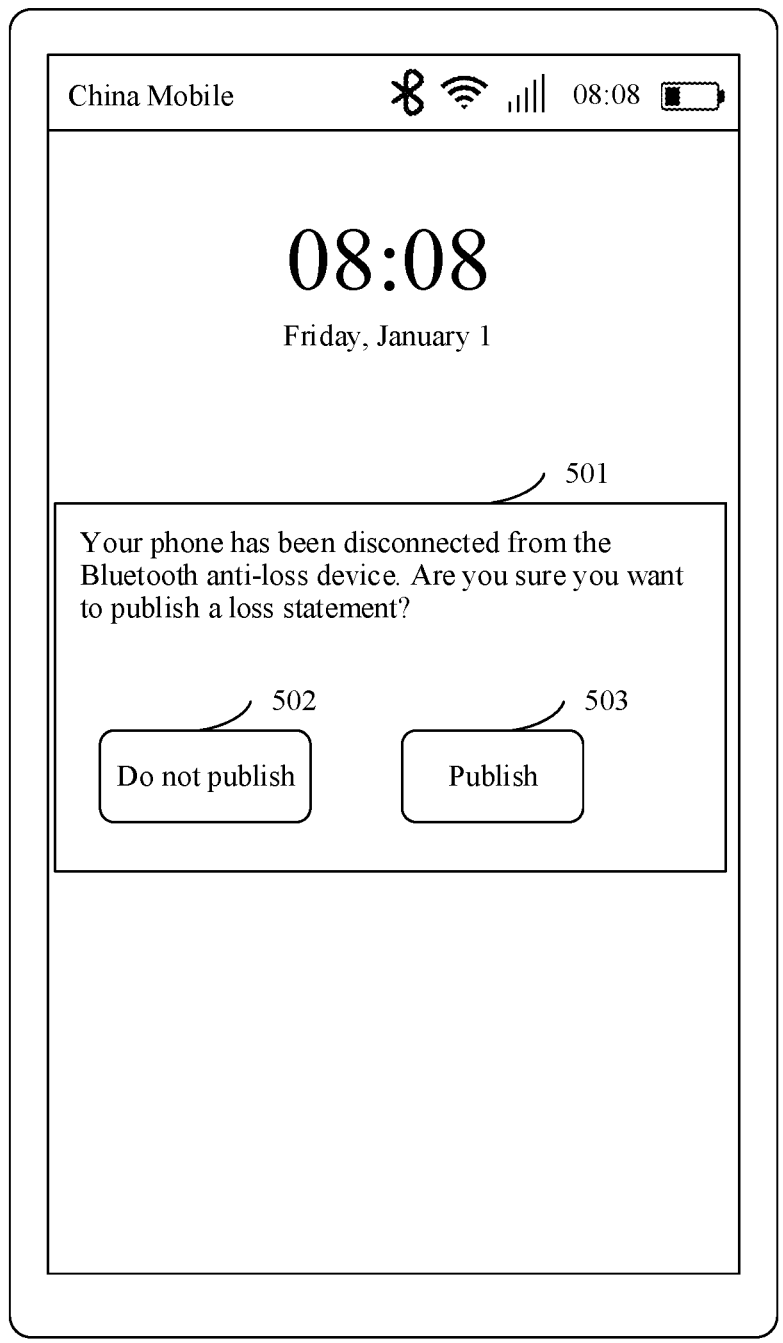
FIG. 5A is a schematic diagram 6 of a user interface of a terminal according to an embodiment of this application.

In an example, the first terminal is in a black screen state. When the first terminal detects that the first terminal is disconnected from the Bluetooth anti-loss device, the first terminal may light up a screen, and display one piece of notification information on a lock screen to prompt the user whether to publish the loss statement. As shown in FIG. 5A, notification information 501 may further include a control 502 "Do not publish" and a control 503 "Publish". After viewing the notification information 501, the user may check whether the target object bound to the Bluetooth anti-loss device is lost. If the target object is not lost, the user may tap the control 502 "Do not publish". If the target object is lost, the user may tap the control 503 "Publish", in other words, trigger the first terminal to publish a search request to the application server 400 by using the first application.

Figure 5B:
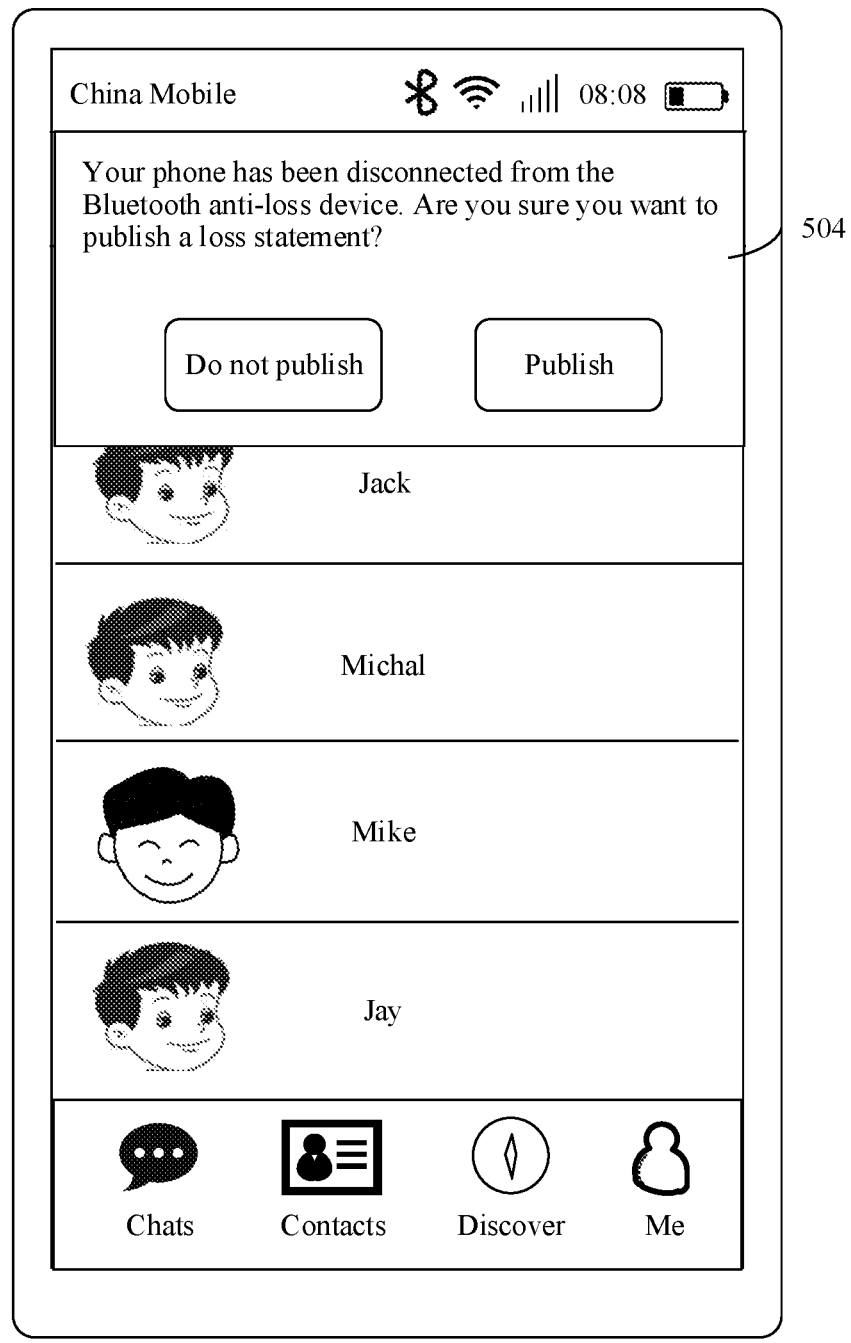
FIG. 5B is a schematic diagram 7 of a user interface of a terminal according to an embodiment of this application.

In another example, the user may be using another application (for example, a "WeChat" application) of the first terminal. In this case, when detecting that the first terminal is disconnected from the Bluetooth anti-loss device, the first terminal may display one piece of prompt information above a current interface or at another location. For example, as shown in FIG. 5B, prompt information 504 is displayed above a "WeChat" application interface.

It can be understood that, when the first terminal displays the prompt information, the first terminal may further prompt the user in another manner such as a voice manner, a music manner, a vibration manner, or an animation manner.

Figure 5C:
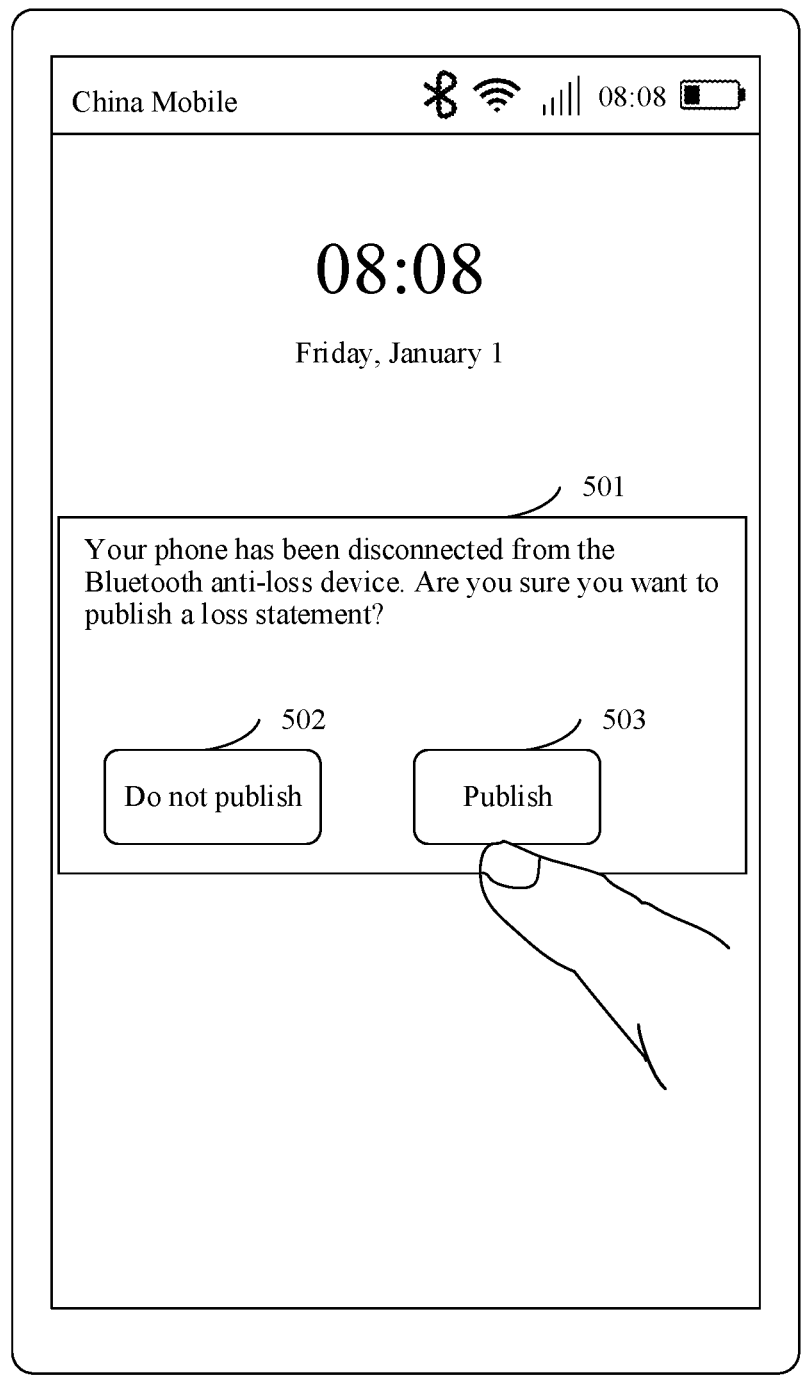
FIG. 5C is a schematic diagram 8 of a user interface of a terminal according to an embodiment of this application.

As shown in FIG. 5C, in response to an operation that the user taps the control 503 "Publish", the first terminal starts the first application and jumps to an interface (an interface shown in FIG. 5D) for publishing a loss statement, or the first terminal switches the first application from background running to foreground running and jumps to an interface for publishing a loss statement.

In an example, the first terminal may consider by default that a location at which the first terminal is disconnected from the Bluetooth anti-loss device is a first location. The location at which the first terminal is disconnected from the Bluetooth anti-loss device is a latest location of the first terminal that is obtained by the first terminal by using an apparatus such as a GPS before the first terminal is disconnected from the Bluetooth anti-loss device, that is, in terms of time, the location of the first terminal that is obtained by the first terminal by using the apparatus such as the GPS at a moment 2 closest to a moment 1 at which the first terminal is disconnected from the Bluetooth anti-loss device. It should be noted that the application server 400 subsequently determines a search range based on the first location, for example, uses the first location as a center location of the search range.

Figure 5D:
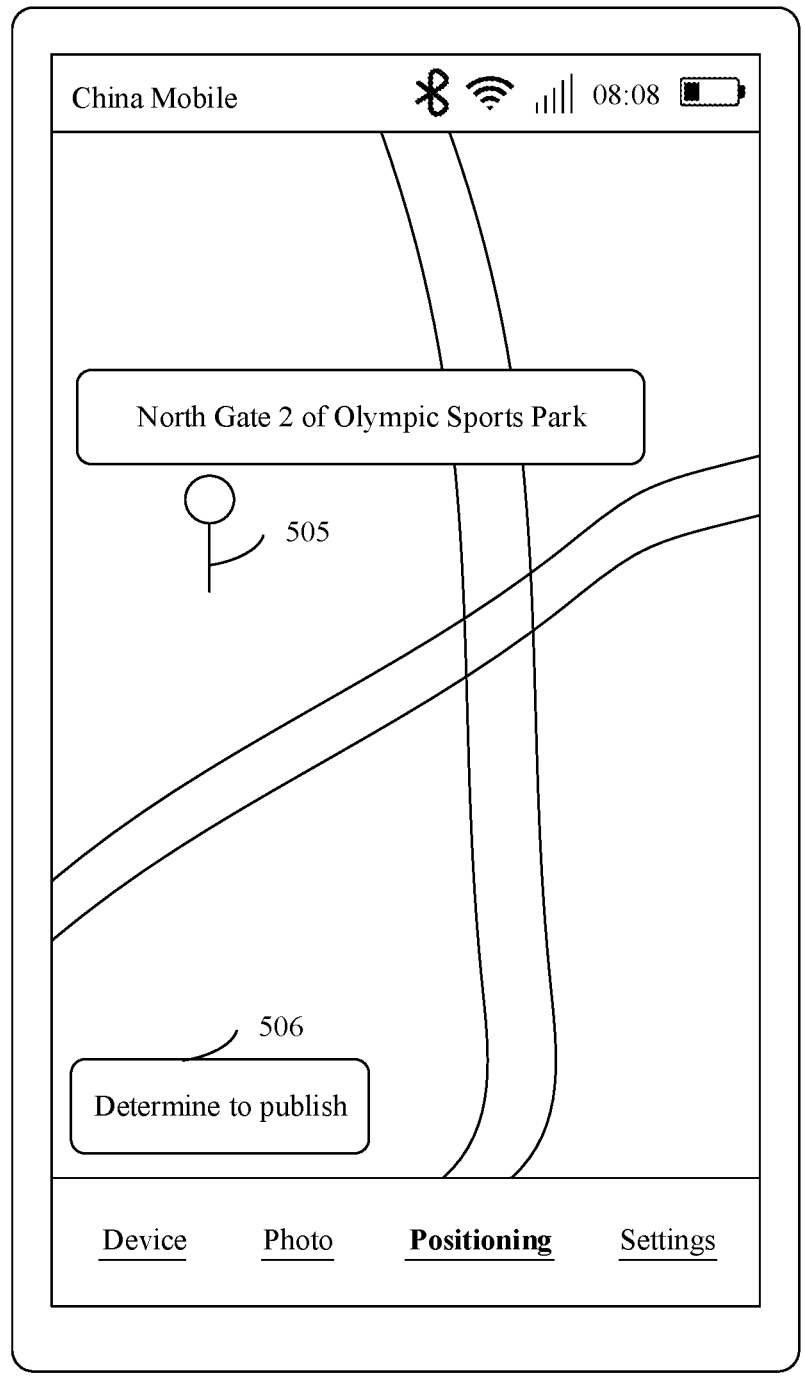
FIG. 5D is a schematic diagram 9 of a user interface of a terminal according to an embodiment of this application.

For example, on the interface shown in FIG. 5D, an address indicator 505 is located by default at the location at which the first terminal is disconnected from the Bluetooth anti-loss device (for example, "North Gate 2 of Olympic Sports Park"). If the user does not modify the first location, the user may directly tap a control 506 "Determine to publish". In this case, the first terminal sends the first location, an identifier of the Bluetooth anti-loss device, and the like to the application server 400, to request to search for the Bluetooth anti-loss device. The identifier of the Bluetooth anti-loss device is a unique identifier used by the application server 400 to distinguish between the Bluetooth anti-loss device and another Bluetooth device, for example, may be a MAC address of the Bluetooth anti-loss device.

In another example, considering that the location at which the first terminal is disconnected from the Bluetooth anti-loss device may not be a location at which the target object is lost, the user may determine, based on user's memory and estimation, the location at which the target object may be lost. In other words, the first terminal may alternatively determine the first location based on the user input. For example, the user may enter the location at which the target object may be lost, and the first terminal uses the location as the first location. For another example, the first terminal may alternatively consider by default that the location at which the first terminal is disconnected from the Bluetooth anti-loss device is the first location, and then the first terminal may receive a modification of the first location by the user. For example, as shown in FIG. 5D, the user may modify the default first location by moving a map or the address indicator 505. For example, the first terminal uses a modified first location as the center location of the search range.

3. The application server 400 delivers a search task to a second terminal by using a staged search strategy.

After the application server 400 receives the loss statement published by the first terminal (that is, the search request published by the first terminal), the application server 400 performs a search by using the staged search strategy. A one-stage search strategy corresponds to a one-stage search process. The application server 400 determines, according to each stage of search strategy, a second terminal that participates in a current-stage search process. The second terminal is a terminal that performs a search task, for example, includes a terminal 500 and a terminal 600. Because stages of search strategies are different, stages of search processes generally have different quantities of second terminals.

The terminal 100 adds the identifier of the Bluetooth anti-loss device to the loss statement sent to the application server 400. Then, when the application server 400 delivers the search task to the determined second terminal, the search task may carry the identifier of the Bluetooth anti-loss device. A plurality of second terminals that receive the search task each enable a Bluetooth scanning function to perform scanning. The second terminal performs matching between an identifier of a Bluetooth device obtained through scanning and the Bluetooth identifier of the Bluetooth anti-loss device in the search task. If the identifier of the Bluetooth device obtained through scanning matches the Bluetooth identifier of the Bluetooth anti-loss device in the search task, it is considered that the Bluetooth device is found through scanning. When one or more second terminals find the Bluetooth anti-loss device, the one or more second terminals may report respective locations to the application server 400. Then, the application server 400 may terminate a subsequent search process.

For example, each stage of search strategy includes a search range, a search density, a search frequency, and search duration. In other words, the stages of search processes generally have different search ranges and use different search densities, search frequencies, and search duration. Specific content of the staged search strategy is described in detail below.

In some examples, the first terminal may also display information about a search progress, so that the user understands the search progress. For example, as shown in FIG.

Figure 6A:
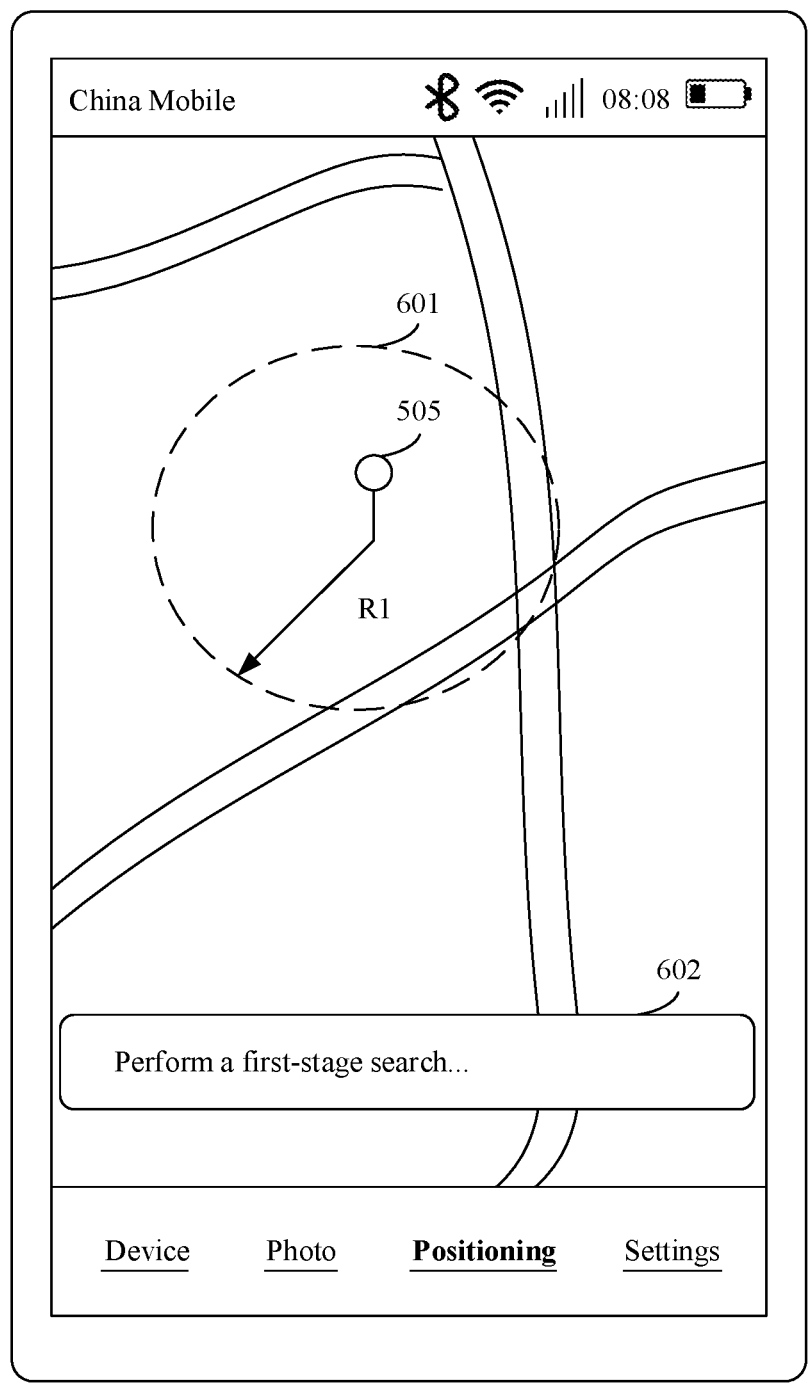
FIG. 6A is a schematic diagram 10 of a user interface of a terminal according to an embodiment of this application.

6A, the first terminal may display prompt information 602 to prompt the user that the first-stage search process is being performed. Optionally, the first terminal may alternatively mark a current search range on the map. For example, still as shown in FIG. 6A, the first terminal may display a mark 601 to indicate that the current search range is circular coverage whose center is the first location and radius is R1. In some other examples, the first terminal may also display information about the second terminal that participates in the search task, for example, locations and a quantity of second terminals that participate in the search task. This is not specifically limited in this embodiment of this application.

Figure 6B:
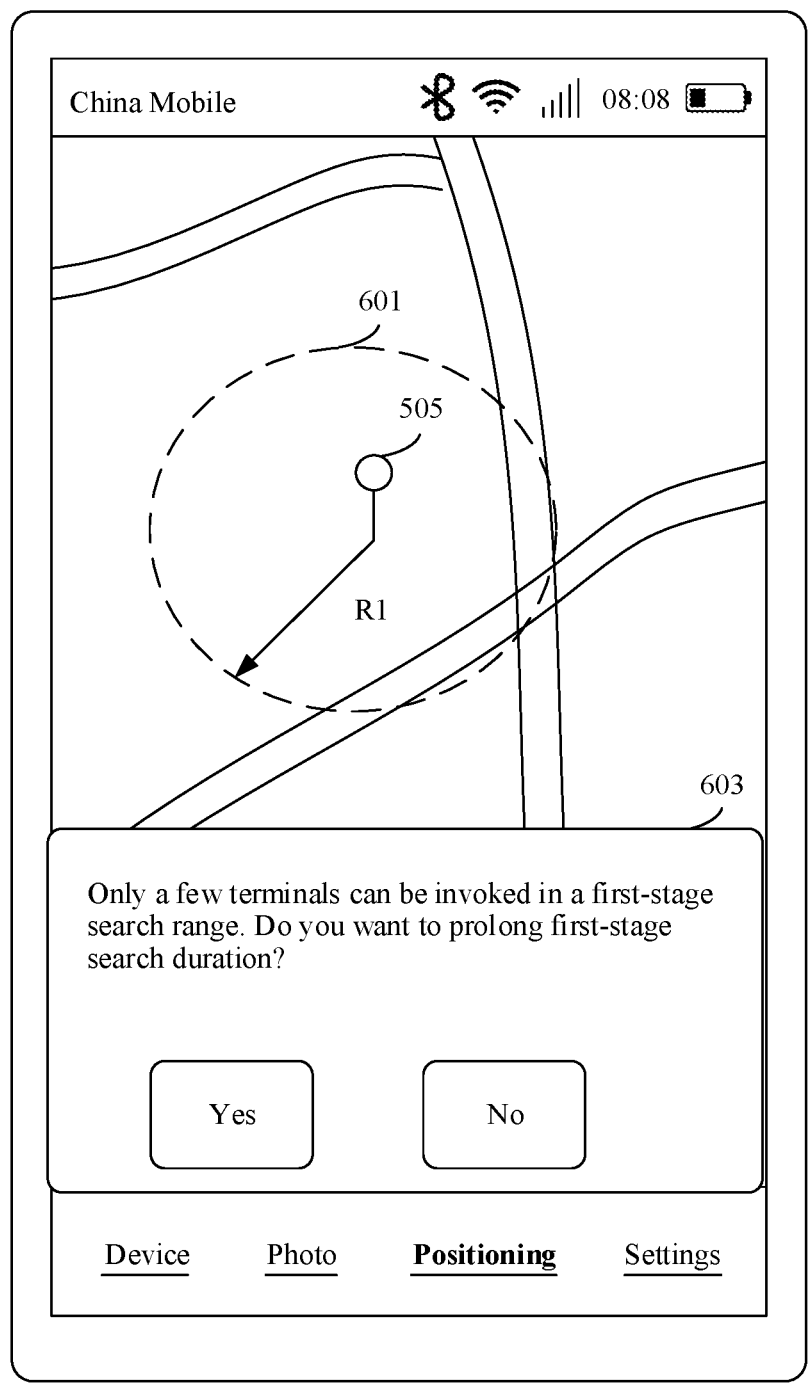
FIG. 6B is a schematic diagram 11 of a user interface of a terminal according to an embodiment of this application.

In some embodiments, when there is a relatively small quantity of second terminals that perform the search task in the first-stage search process, the application server 400 may also prompt the user by using the first terminal, and query the user whether duration of the first-stage search process needs to be prolonged. For example, as shown in FIG. 6B, the first terminal may display prompt information 603 to prompt the user whether the first-stage search duration needs to be prolonged. If the user taps a button "Yes", the first-stage search duration is prolonged, and the search continues to be performed based on a first-stage search density and a first-stage search frequency. If the user taps a button "No", the first-stage search duration is not prolonged, and a next-stage search process continues to be performed.

In some other embodiments, when the first-stage search process ends and no second terminal finds the Bluetooth anti-loss device, the application server 400 continues to deliver the search task, and a second terminal that participates in a second-stage search process performs the search task.

Figure 6C:
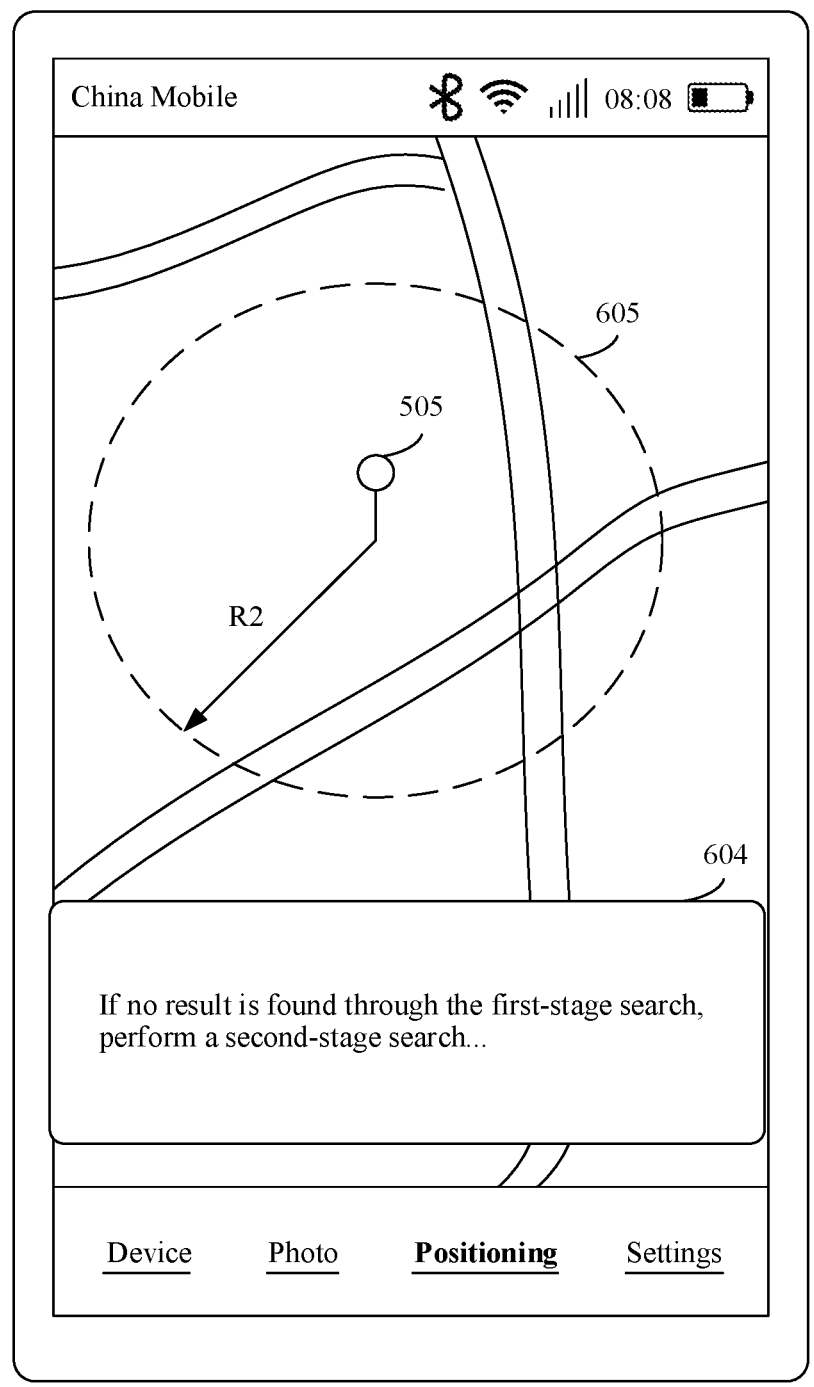
FIG. 6C is a schematic diagram 12 of a user interface of a terminal according to an embodiment of this application.

For example, as shown in FIG. 6C, the first terminal may display prompt information 604 to prompt the user that the second-stage search is being performed. In an embodiment, the first terminal may alternatively mark a current search range on the map. For example, still as shown in FIG. 6B, the first terminal may display a mark 605 to indicate that the current search range is circular coverage whose center is the first location and radius is R2. Obviously, R2 in FIG. 6B is greater than R1 in FIG. 6A.

It is assumed that there is a second terminal that finds the Bluetooth anti-loss device in the second-stage search process. In this case, the second terminal that finds the Bluetooth anti-loss device reports a location (a second location) of the second terminal to the application server 400. The application server 400 terminates the second-stage search process and a next-stage search process (for example, a third-stage search process or a fourth-stage search process), and sends the second location to the first terminal. In some other examples, the second terminal that finds the Bluetooth anti-loss device may also notify the application server 400 that the Bluetooth anti-loss device is found. In other words, the second terminal may alternatively not report the location of the second terminal. In this case, the application server 400 may send the location (the second location) of the second terminal stored in the application server 400 to the first terminal.

Figure 6D:
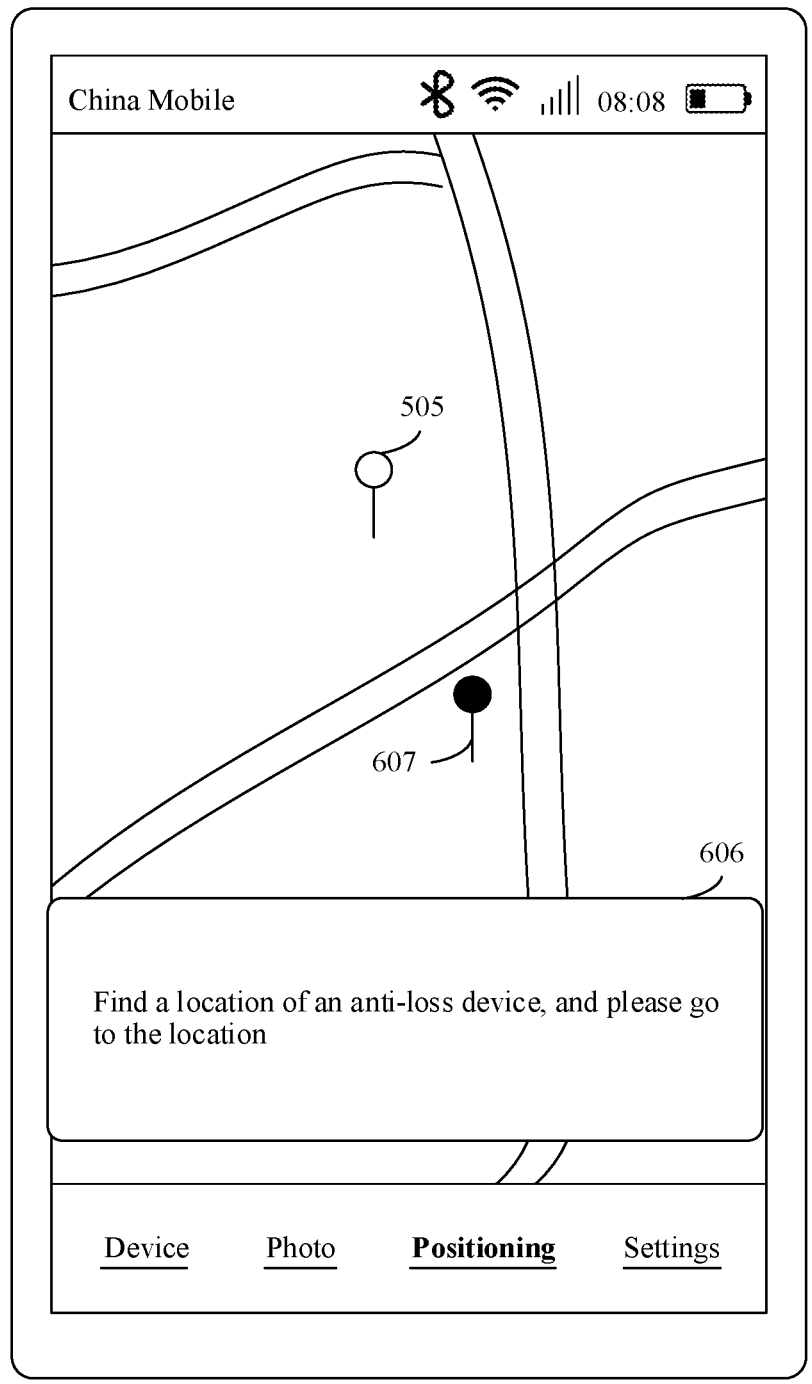
FIG. 6D is a schematic diagram 13 of a user interface of a terminal according to an embodiment of this application.

The first terminal may display notification information to prompt the user that the target object is found. For example, as shown in FIG. 6D, the first terminal displays prompt information 606 on the interface of the first application to prompt the user with "The anti-loss device is found, and please go to the location." Optionally, the first terminal may also display positioning 607 of the second location on the map, so that the user learns of a detailed address of the second location.

When the user arrives at the second location with the first terminal, the first terminal may start to perform Bluetooth scanning automatically or based on a user indication. After the Bluetooth anti-loss device is obtained through scanning, a connection to the Bluetooth anti-loss device is automatically established, and the Bluetooth anti-loss device is triggered automatically or based on the user indication to give an alarm, so that the user can find the target object.

Figure 6E:
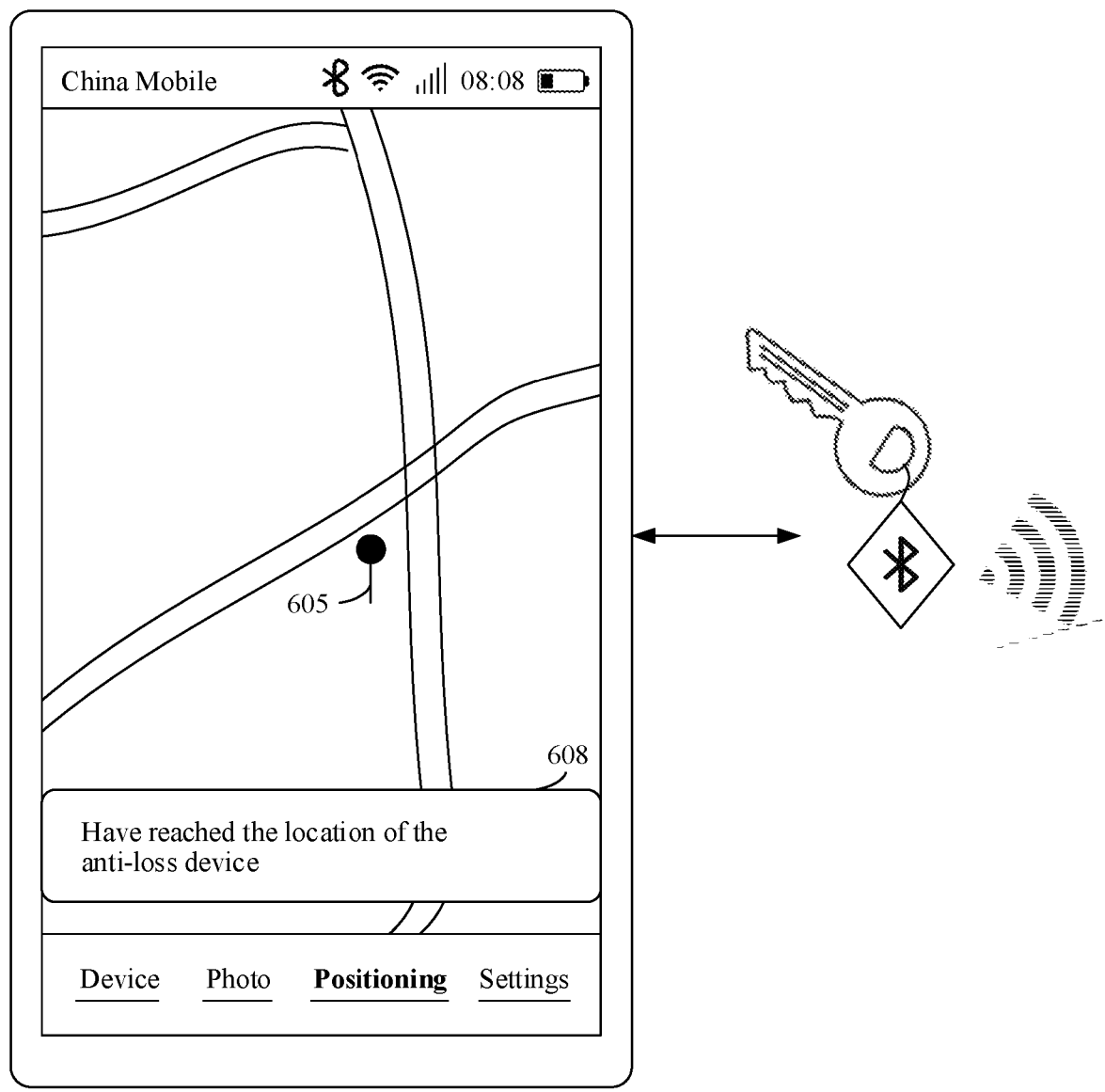
FIG. 6E is a schematic diagram 14 of a user interface of a terminal according to an embodiment of this application.

In some examples, when the first terminal arrives at the second location, the first terminal may also prompt the user. For example, as shown in FIG. 6E, the first terminal displays prompt information 608 to prompt the user with "Near the anti-loss device".

It can be understood that a value of each parameter in the foregoing staged search strategy may be set by the application server 400 by default, or may be set by the user of the first terminal, or may be a value automatically learned by the application server 400 based on a historical search process, or the like. This is not specifically limited in this embodiment of this application. For example, the application server 400 may determine a default quantity of stages in the staged search strategy. For example, a three-stage search strategy or a four-stage search strategy is used by default. For another example, the user may customize a quantity of stages in the staged search strategy based on importance of the target object. For still another example, the application server 400 may automatically determine a quantity of stages in the staged search strategy based on a city to which the first location belongs and a population distribution status of the city.

Figure 6F:
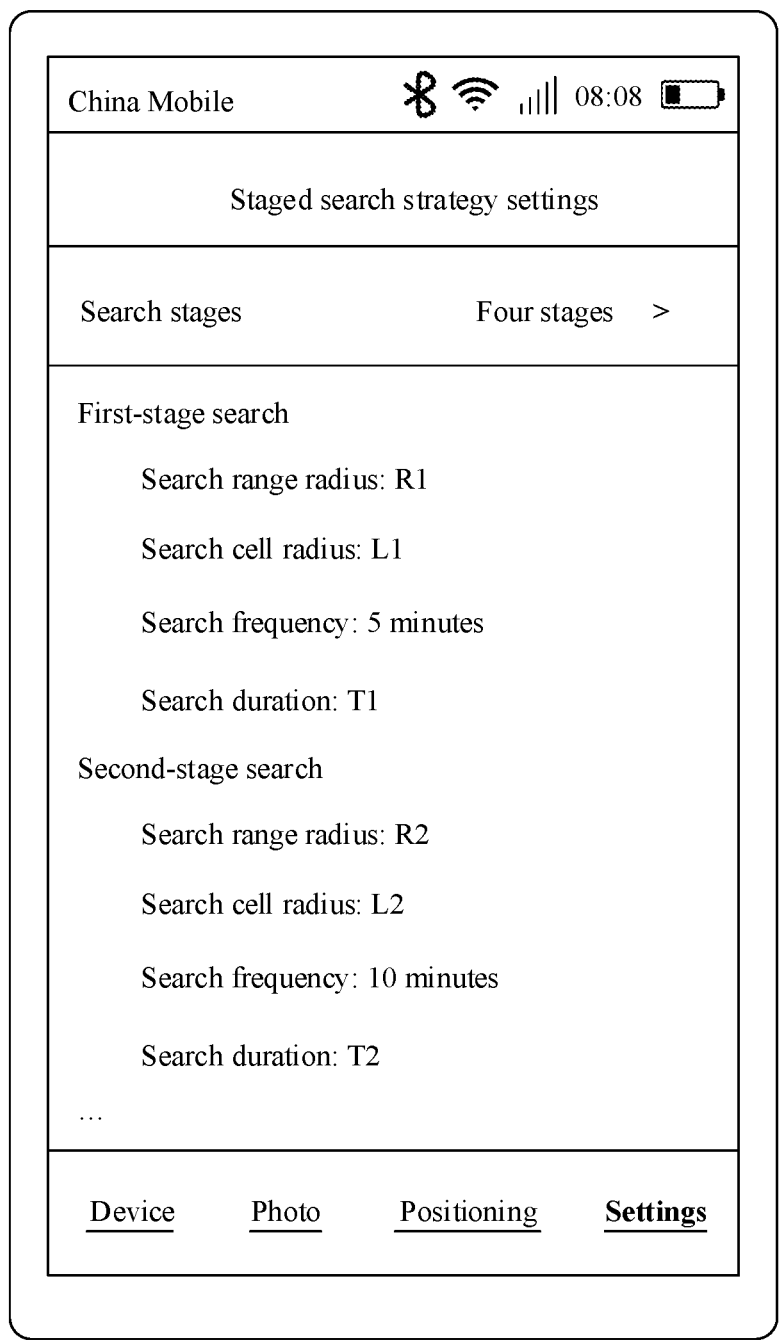
FIG. 6F is a schematic diagram 15 of a user interface of a terminal according to an embodiment of this application.

For example, as shown in FIG. 6F, the user may set each parameter in the staged search strategy through the setting interface of the first application. Each parameter in the staged search strategy may include the quantity of search stages, and the search range, the search density, the search frequency, the search duration, and the like of each stage of search strategy.

The staged search strategy is described in detail below.

In some embodiments of this application, a search strategy includes parameters such as a search range, a search density, a search frequency, and search duration.
Search Range In an embodiment, the application server 400 may determine the search range in each stage of search strategy based on the first location carried in the loss statement. In addition, the stages of search strategies generally have different search ranges.

For example, because the user just loses the target object, in other words, when the first terminal just publishes the loss statement, that the first location reported by the first terminal is the location at which the target object is lost has relatively high credibility. Therefore, it may be determined that the search range is near the first location. As a search process proceeds, an original search range has been searched. Therefore, the search range can be expanded by stages.

Figure 7:
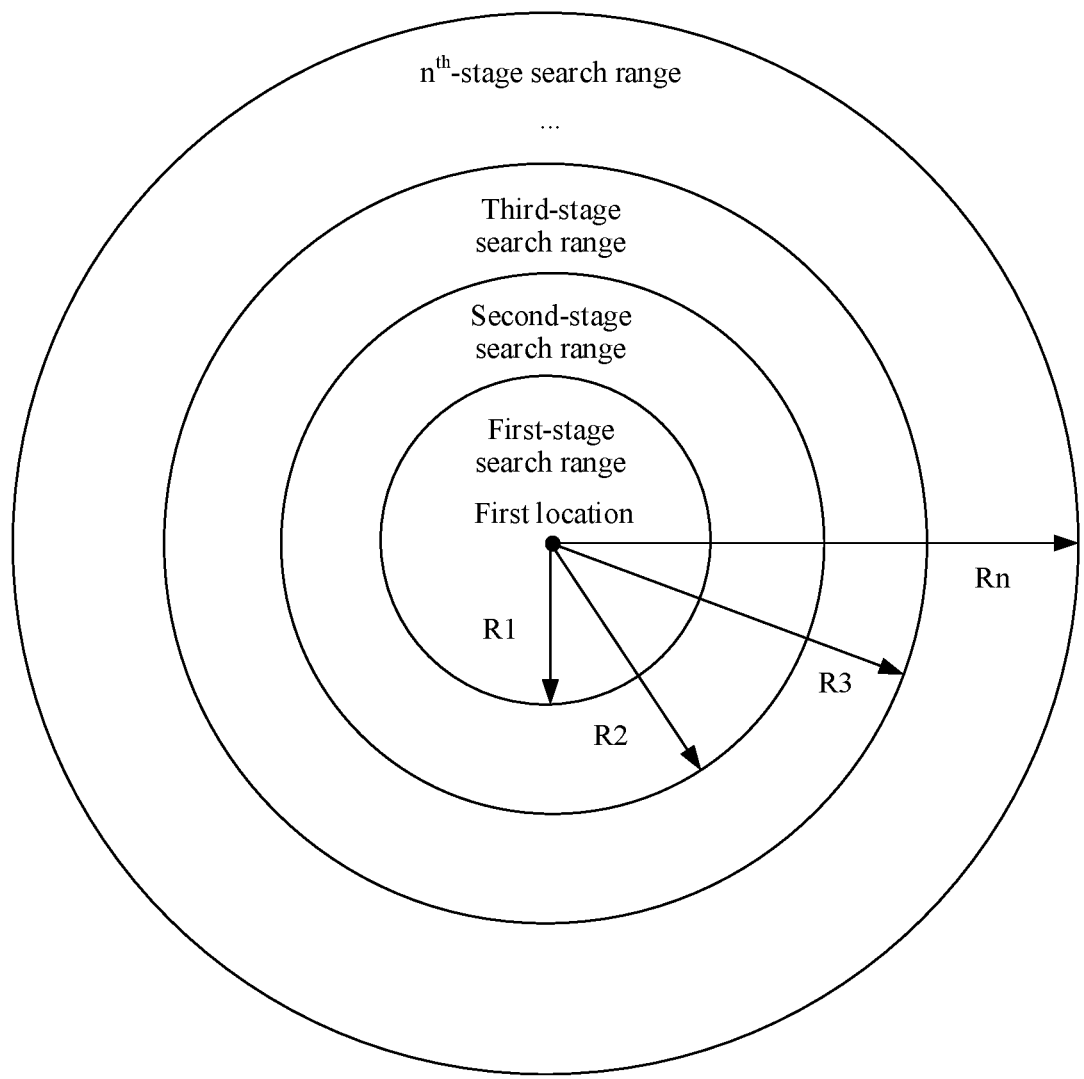
FIG. 7 is a schematic diagram of a search range determining method according to an embodiment of this application.

For example, as shown in FIG. 7, a first-stage search range is searched within a first time period (for example, within 2 hours after the first terminal publishes the loss statement), and the first-stage search range is circular coverage whose center is the first location and radius is R1; a second-stage search range is searched within a second time period (for example, within 3 hours to 9 hours after the first terminal publishes the loss statement), and the second-stage search range is circular coverage whose center is the first location and radius is R2; and a third-stage search range is searched within a third time period (for example, within 10 hours to 22 hours after the first terminal publishes the loss statement), and the third-stage search range is circular coverage whose center is the first location and radius is R3. By analogy, an $n^{th}$-stage search range is circular coverage whose center is the first location and radius is Rn. Herein, R1<R2<R3< . . . <Rn.

It can be understood that the search range herein is described by using a circular area as an example. Certainly, the search range may alternatively be an area of any other shape, for example, square coverage whose center is the first location and side length is 2*Rn. This is not limited in this embodiment of this application. In this embodiment of this application, a specific shape of the search range is not limited, and a specific method for determining the search range based on the first location is not limited either.

In an embodiment, in each stage of search process, the application server 400 performs a search by using a current-stage search strategy. In addition to a search range, the current-stage search strategy further includes a specific quantity of resources that are allocated by the application server 400 to a current-stage search process and that are used to search for the target object in the current-stage search range. Generally, the stages of search strategies are different, in other words, resources allocated by the application server 400 to search for the target object are different.

For example, because the user just loses the target object, in other words, when the first terminal just publishes the loss statement, that the first location reported by the first terminal is the location at which the target object is lost has relatively high credibility. In this case, a probability of finding the target object is very high, and therefore more resources may be allocated for searching. As a time elapses and duration in which the target object is lost is prolonged, the probability of finding the target object is reduced subsequently, and therefore less resources may be allocated for searching.

In some embodiments of this application, in each stage of search strategy, the search density, the search frequency, and the search duration may be used to represent the quantity of resources allocated by the application server 400 to the current-stage search process.

Search Density

In an embodiment, the one-stage search process may include a plurality of search processes. This is because a second terminal in the search range is invoked to perform Bluetooth scanning to discover the Bluetooth anti-loss device in the technical solution of this application. In an actual scenario, due to urban population distribution, a factor that only a second terminal that pre-registers a search service can participate in a search task, and the like, a relatively small quantity of second terminals that can participate in the search service exist in the search range and are unevenly distributed. Therefore, in the one-stage search process, the application server 400 may deliver the search task for a plurality of times, in other words, perform a plurality of search processes, so as to ensure that a current-stage search range is thoroughly searched.

The search density means a quantity of search cells included in a unit area search range in one search process. The application server 400 needs to determine, for each search cell, a preset quantity of second terminals (for example, one second terminal) to participate in the search process. It is easy to understand that the search density reflects the quantity of second terminals that participate in the one-stage search process and that are determined by the application server 400. In search ranges having a same area, a higher search density indicates that more search cells are included in one search process and more terminal resources need to be invoked. Because the probability of finding the target object is reduced as the duration in which the target object is lost is prolonged, the application server 400 gradually reduces resources used for performing the search task. In other words, as the duration in which the target object is lost is prolonged, each stage of search density is reduced.

It should be noted that the search density reflects a quantity of second terminals invoked in the unit area search range. A quantity of second terminals invoked in a specific-stage search range is determined based on both a total area of the current-stage search range and a current-stage search density. For example, a specific-stage search range is 500 square meters, a search density is two search cells per 100 square meters, and one second terminal is determined for each search cell. In this case, 10 second terminals need to be invoked in the current-stage search range. For another example, a specific-stage search range is 1000 square meters, and a same search density is used. In this case, it is determined that 20 second terminals need to be invoked.

For example, a first search density is used within the first time period (for example, within 2 hours after the first terminal publishes the loss statement), a second search density is used within the second time period (for example, within 3 hours to 9 hours after the first terminal publishes the loss statement), and a third search density is used within the third period (for example, within 10 hours to 22 hours after the first terminal publishes the loss statement). By analogy, an $n^{th}$ search density is used within an $n^{th}$ time period. Herein, first search density>second search density>third search density> . . . >$n^{th}$ search density.

In some examples, the quantity of search cells may alternatively be determined by setting an area of a search cell. For example, if a radius of a search cell is set to L, an area of the search cell is $\pi*L^2$ (an example in which the search cell is a circle is used). Then, a quantity of search cells included in one search process may be determined based on the area of the current-stage search range.

For example, a radius of a search cell is set to L1 within the first time period (for example, within 2 hours after the first terminal publishes the loss statement), a radius of a search cell is set to L2 within the second time period (for example, within 3 hours to 9 hours after the first terminal publishes the loss statement), a radius of a search cell is set to L3 within the third time period (for example, within 10 hours to 22 hours after the first terminal publishes the loss statement), By analogy, a radius of a search cell is set to Ln within the $n^{th}$ time period. Herein, L1<L2<L3< . . . <Ln.

The search strategy in this embodiment of this application includes the search density. In other words, the preset quantity of second terminals (for example, one second terminal) is determined from the determined search cell to perform the search task. This can prevent a plurality of second terminals in a same search cell from repeatedly performing a search task, and reduce terminal resources.

Search Frequency

The search frequency means an interval (for example, 5 minutes, 10 minutes, 30 minutes) at which the application server 400 schedules one appropriate second terminal to perform one search process in the one-stage search process. As mentioned above, because the probability of finding the target object is reduced as the duration in which the target object is lost is prolonged, the application server 400 gradually reduces resources used for performing the search task. In other words, as the duration in which the target object is lost is prolonged, each stage of search frequency is reduced.

For example, a first search frequency is used within the first time period (for example, within 2 hours after the first terminal publishes the loss statement), a second search frequency is used within the second time period (for example, within 3 hours to 9 hours after the first terminal publishes the loss statement), and a third search frequency is used within the third time period (for example, within 10 hours to 22 hours after the first terminal publishes the loss statement). By analogy, an $n^{th}$ search frequency is used within the $n^{th}$ time period. Herein, first search frequency>second search frequency>third search frequency> . . . >$n^{th}$ search frequency.

Search Duration

The search duration is duration (for example, 2 hours, 6 hours, or 12 hours) in which the application server 400 performs the current-stage search process. As the duration in which the target object is lost is prolonged, resources used for each stage of search process are reduced, and each stage of search duration can be appropriately prolonged. In some embodiments, if the application server 400 determines a relatively small quantity of second terminals in the current-stage search process, the current-stage search duration may be appropriately prolonged, to ensure that the current-stage search range is thoroughly searched.

It should be noted that a total quantity of search processes performed by the application server 400 in each stage of search process is determined based on both the search frequency and the search duration. The total quantity of search processes performed in each stage of search process may indirectly ensure that the current-stage search range is thoroughly searched. Therefore, the search frequency and the search duration are set with a need of considering a correlation between the two.

For example, it is assumed that a specific-stage search strategy is: a search range is a circular area with a radius of 500 meters, a radius of a single search cell is 20 meters, and search duration is 2 hours.

Because the current-stage search area is a circular area with a radius of 500 meters, an area of the first-stage search range is 785000 square meters. Because the radius of the single search cell is 20 meters, an area of the single search cell is 1256 square meters. To be specific, the search density is 1256 search cells required per square kilometer.

In this case, the current-stage search range is thoroughly searched by using 785000÷1256=625 second terminals.

Because the second terminals are unevenly distributed and some second terminals in the current-stage search range cannot participate in the search (for example, some second terminals enable "Do Not Disturb" and some second terminals do not participate in the search), to maximize the probability of finding the target object, the current-stage search range may be thoroughly searched for a specific quantity of times (for example, five times).

Implementing five times of thorough searches requires 625×5=3125 searches.

In other words, the application server 400 needs to deliver the search task for at least five times. Because the duration of the current-stage search process is 2 hours, the task is delivered for five times within 2 hours, and an average interval is 120÷5=24 minutes, in other words, the search frequency is 24 minutes/time.

In other words, when the current-stage search duration is 2 hours, the current-stage search frequency should not be less than 24 minutes/time. Alternatively, when the current-stage search frequency is set to 24 minutes/time, the current-stage search duration should not be less than 2 hours.

In summary, it is assumed that the application server 400 determines to use an N-stage search strategy. Parameters used in an $M^{th}$-stage search strategy include an $M^{th}$ range, an $M^{th}$ density, an $M^{th}$ frequency, and $M^{th}$ duration. Parameters used in an $(M+1)^{th}$-stage search strategy include an $(M+1)^{th}$ range, an $(M+1)^{th}$ density, an $(M+1)^{th}$ frequency, and $(M+1)^{th}$ duration. Herein, N is a positive integer greater than 2, and M is a positive integer greater than 0 and less than N.

The $(M+1)^{th}$ range is greater than the $M^{th}$ range.

In an example, the $M^{th}$ range is circular coverage whose center is the first location and radius is $R_M$, and the $(M+1)^{th}$ range is circular coverage whose center is the first location and radius is $R_{M+1}$, where $R_{M+1}$ is greater than $R_M$.

The $(M+1)^{th}$ density is less than the $M^{th}$ density.

In an example, a radius or a side length of a search cell in the $M^{th}$-stage search strategy is $L_M$, and a radius or a side length of a search cell in the $(M+1)^{th}$-stage search strategy is $L_{M+1}$, where $L_{M+1}$ is greater than $L_M$.

The $(M+1)^{th}$ frequency is less than the $M^{th}$ frequency.

The $(M+1)^{th}$ duration is greater than or equal to the Mt duration.

In a specific example, the application server 400 may determine to use a four-stage search strategy, and parameters included in each stage of search strategy are described as follows:

First-Stage Search Strategy:

Search range: The search range is circular coverage whose center is the first location and radius is 0.5 kilometers.

Search density: The search density is calculated by using a circular area with a radius of 10 meters as a search cell.

Search frequency: One search is performed by invoking one appropriate second terminal in the search range every 5 minutes.

Search duration: The search duration is 2 hours.

Second-Stage Search Strategy:

Search range: The search range is circular coverage whose center is the first location and radius is 3 kilometers.

Search density: The search density is calculated by using a circular area with a radius of 15 meters as a search cell.

Search frequency: One search is performed by invoking one appropriate second terminal in the search range every 10 minutes.

Search duration: The search duration is 6 hours.

Third-Stage Search Strategy:

Search range: The search range is circular coverage whose center is the first location and radius is 10 kilometers.

Search density: The search density is calculated by using a circular area with a radius of 20 meters as a search cell.

Search frequency: One search is performed by invoking one appropriate second terminal in the search range every 30 minutes.

Search duration: The search duration is 12 hours.

Fourth-Stage Search Strategy:

Search range: The search range is the entire city.

Search density: The search density is calculated by using a circular area with a radius of 30 meters as a search cell.

Search frequency: One search is performed by invoking one appropriate second terminal in the search range every 30 minutes.

Search duration: The search duration is 48 hours.

The following uses a first-stage search process corresponding to the first-stage search strategy as an example to describe an example in which the application server 400 performs the first-stage search process.

Figure 8:
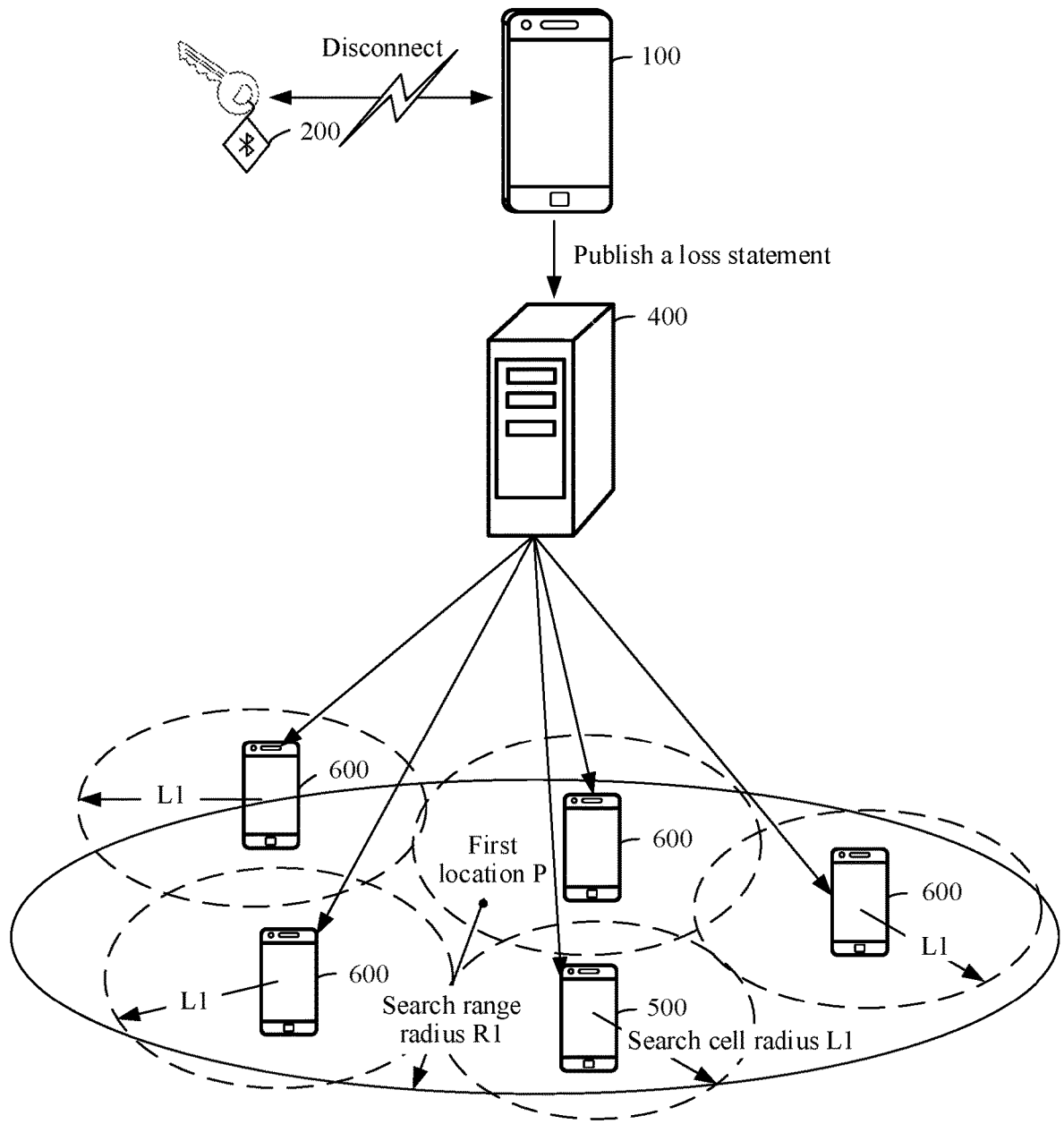
FIG. 8 is a schematic diagram of a search process according to an embodiment of this application.

As shown in FIG. 8, when the Bluetooth anti-loss device is disconnected from the first terminal (the terminal 100), the user publishes a loss statement to the application server 400 by using the first terminal. The loss statement carries a first location, and the first location is a location at which the Bluetooth anti-loss device is disconnected from the first terminal or a location that is entered by the user and at which the target object may be lost. For example, the first location may be longitude and latitude data.

First, the application server 400 determines a first-stage search range based on the first location.

The first-stage search range may be an area of any shape. For example, the first-stage search range is circular coverage whose center is the first location and radius is R1. For another example, the first-stage search range is square coverage whose center is the first location and side length is 2*R1.

Then, the application server 400 determines a search cell based on the first-stage search range and a first search density. The determining includes: determining a quantity of search cells and longitude and latitude bounds of each search cell.

The search cell may also be an area of any shape. For example, the shape of the search cell may be a circular area with a radius of L1, or may be a square area with a side length of 2*L1. It can be understood that the shape of the search cell may be the same as or different from the shape of the first search range.

An example in which the radius R1 of the first-stage search range is 0.5 kilometers and the radius L1 of the search cell is 20 meters is used for description.

For example, if both the first-stage search range and the search cell are circular areas, an area of each search cell is $\pi*(L1)^2$ square meters. In This case, there are $(\pi*(R1)^2)/(\pi*(L1)^2)=625$ search cells in the first search range. In other words, an area of the first search range is divided into the 625 search cells. A specific division method is not limited.

For another example, both the first search range and the search cell are square areas. If the side length R1 of the first-stage search range is 0.5 kilometers, and the side length L1 of the search cell is 20 meters, an area of each search cell is (20*20) square meters. In this case, there are (500*500)/(20*20)=625 search cells in the first search range. In other words, an area of the first search range is divided into the 625 search cells. A specific division method is not limited.

The quantity of search cells into which the first-stage search range needs to be divided is determined by using the foregoing method. In addition, longitude and latitude bounds of the first-stage search range may be determined based on longitude and latitude of the first location, so that the longitude and latitude bounds of each search cell in the first-stage search range can be determined.

An example in which both the first-stage search range and the search cell are square areas is still used to describe a method for determining the longitude and latitude bounds of each search cell in the first-stage search range.

Figure 9:
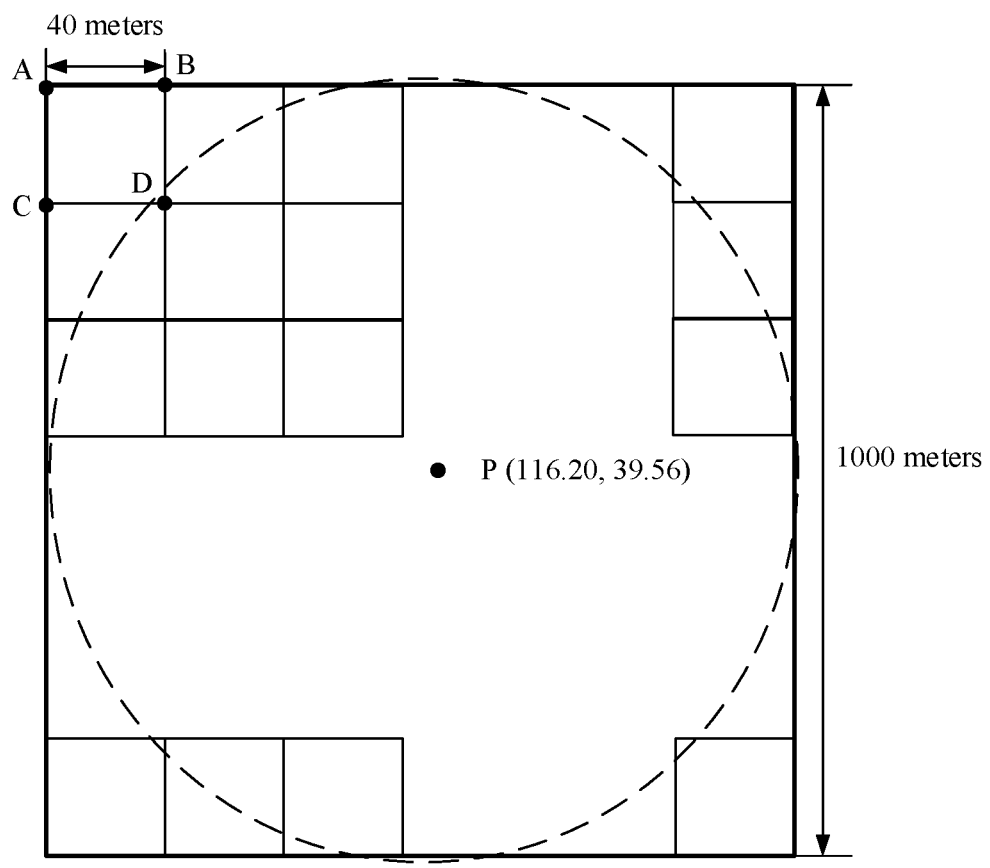
FIG. 9 is a schematic diagram of a search cell determining method according to an embodiment of this application.

For example, as shown in FIG. 9, the first location is a point P, and the point P is at longitude and latitude (116.20, 39.56); the first-stage search range is a square area whose center is the point P and side length is 2*R1 (R1=500 meters); and one search cell is a square area with a side length of 40 meters. Then, the longitude and latitude bounds of the first-stage search range are determined based on the longitude and latitude of the point P and the side lengths. For a specific determining method, refer to related technologies in this field.

Herein, for ease of understanding, the determining method may be simplified. For example, in terms of longitude and latitude, it is set by default that a distance difference is approximately 1 meter every 0.00001 degrees, the distance difference is approximately 10 meters every 0.0001 degrees, the distance difference is approximately 100 meters every 0.001 degrees, the distance difference is approximately 1000 meters every 0.01 degrees, and the distance difference is approximately 10000 meters every 0.1 degrees.

Therefore, longitude and latitude of four vertices of an upper-left search cell may be determined based on the side lengths and the longitude and latitude of the point P that are as follows: A (116.195, 39.555), B (116.1954, 39.555), C (116.195, 39.5554), and D (116.1954, 39.5554). In this case, longitude and latitude bounds of the upper-left search cell are as follows: 116.195<longitude<116.1954, and 39.555<latitude<39.5554. Likewise, longitude and latitude bounds of another search cell may be calculated.

Then, the application server 400 determines, based on a first-stage search frequency, a preset quantity of terminals (for example, one terminal) from each search cell as second terminals that perform a search task in each search process.

For example, the application server 400 may traverse terminals that can perform a search task in each search cell, and allocate these terminals to corresponding search cells based on locations of the terminals.

The terminal that can perform a search task is a terminal that registers a search service with the application server 400. In some other examples, the second terminal does not enable "Do Not Disturb" at this time. As described above, the terminal that registers a search service reports a real-time location of the terminal to the application server 400 at an interval of a period of time.

It should be noted that, when a quantity of terminals that can perform a search task in a specific search cell exceeds the preset quantity, from the quantity of terminals that can perform a search task, a preset quantity of terminals may be randomly selected as second terminals, or may be preferably selected by using a specific strategy.

Subsequently, the application server 400 delivers the search task to the determined second terminal. The search task includes the identifier of the Bluetooth anti-loss device to be found.

The second terminal that receives the search task starts Bluetooth scanning to search for the Bluetooth anti-loss device.

If a second terminal finds the Bluetooth anti-loss device in a current search process, the second terminal reports a location (e.g., a second location) of the second terminal to the application server 400. The application server 400 sends the second location to the first terminal, and stops a subsequent search process. In some other examples, if a plurality of second terminals all find the Bluetooth anti-loss device in a search process, the application server 400 may determine a first reported location of a second terminal as the second location. In some other examples, in addition to respective locations, the plurality of second terminals that find the Bluetooth anti-loss device may further report respective signal strengths for obtaining the Bluetooth anti-loss device through scanning. A stronger signal strength for scanning indicates a shorter distance between the second terminal and the Bluetooth anti-loss device. Therefore, a location reported by a second terminal with the highest signal strength may be used as the second location. In an embodiment, the application server 400 may further calculate a distance between the application server and the Bluetooth anti-loss device based on the Bluetooth signal strengths of the plurality of second terminals. Then, a more accurate location of the Bluetooth anti-loss device is determined as the second location based on the distance and the location of each second terminal. The calculation method may be a triangulation location method or another geometric method.

If the application server 400 does not receive, within a preset time period, the second location reported by the second terminal, it may be considered that the Bluetooth anti-loss device is not found through scanning in this search process. In this case, the application server determines, based on the first search frequency, a second terminal that performs the search task in a next search process, and delivers the search task. By analogy, the search continues to be performed until a second terminal finds the Bluetooth anti-loss device or duration of the first-stage search process reaches first-stage search duration.

If the duration of the first-stage search process reaches the first-stage search duration and no second terminal finds the Bluetooth anti-loss device, the application server 400 starts to perform a second-stage search process. In the second-stage search process, a related parameter in a second-stage search strategy is used. The second-stage search process is similar to the first-stage search process. Details are not described again.

By analogy, another stage of search process is similar to the first-stage search process. Details are not described again.

Figure 10:
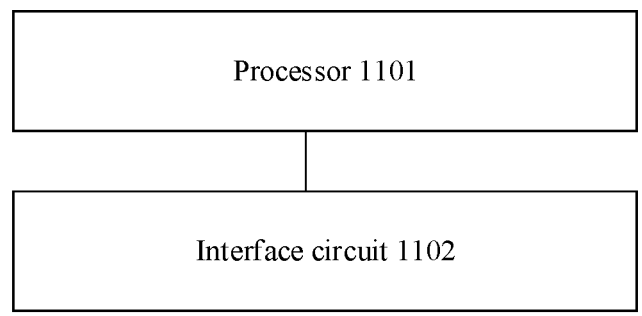
FIG. 10 is a schematic diagram of a structure of a chip system according to an embodiment of this application.

An embodiment of this application further provides a chip system. As shown in FIG. 10, the chip system includes at least one processor 1101 and at least one interface circuit 1102. The processor 1101 and the interface circuit 1102 may be connected to each other through a line. For example, the interface circuit 1102 may be configured to receive a signal from another apparatus (for example, a memory in the terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, the electronic device may be enabled to perform the operations performed by the application server 400 in the foregoing embodiments. Certainly, the chip system may further include another discrete device. This is not specifically limited in this embodiment of this application.

It can be understood that, to implement the foregoing functions, the terminal and the like include corresponding hardware structures and/or software modules for performing the functions. A person skilled in the art should be easily aware that, in combination with units and algorithm operations of the examples described in the embodiments disclosed in this application, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present application.

In the embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of the present application, module division is an example and is merely logical function division. During actual implementation, another division manner may be used.

The foregoing descriptions of the implementations allow a person skilled in the art to understand that, for the purpose of convenient and brief description, division into the foregoing function modules is used as an example for illustration. During actual application, the foregoing functions may be allocated to different modules and implemented according to a requirement, in other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the operations of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for searching objects, comprising:
receiving, by a server, a search request from a first terminal, wherein the search request comprises a first location and an identifier of a Bluetooth device, and the first location is a location at which the first terminal loses a Bluetooth connection to the Bluetooth device, or the first location is a location entered by a user operating the first terminal;
determining, by the server within a first time period, at least one second terminal to perform a search task in a first-stage search process using a first frequency and a first density in a first search range determined based on the first location, and sending a search task that carries the identifier to the at least one second terminal, so that the at least one second terminal enables Bluetooth to search for the Bluetooth device; and
if the server receives a message that is fed back by any one of the at least one second terminal indicating that the Bluetooth device is found, sending, by the server, a second location of the second terminal that finds the Bluetooth device to the first terminal; or if the server does not receive, within the first time period, a message that is fed back by any one of the at least one second terminal indicating that the Bluetooth device is found,
determining, by the server within a second time period after the first time period, at least one third terminal to perform a search task in a second-stage search process using a second frequency and a second density in a second search range, and
sending the search task that carries the identifier to the at least one third terminal, so that the at least one third terminal enables Bluetooth to search for the Bluetooth device,
wherein the second search range is determined by the server based on the first location, the second search range is different from the first search range, the second frequency is less than the first frequency, and the second density is less than the first density.

2. The method according to claim 1, wherein the first search range is circular coverage that is determined by the server and whose center is the first location and radius is a first distance, or rectangular coverage that is determined by the server and whose center is the first location and side length is a distance twice the first distance; and
the second search range is circular coverage that is determined by the server and whose center is the first location and radius is a second distance, or rectangular coverage that is determined by the server and whose center is the first location and side length is a distance twice the second distance, wherein
the second distance is greater than the first distance.

3. The method according to claim 1, wherein the first density represents a quantity of first search cells determined by the server in unit area coverage, which are used to determine the at least one second terminal, wherein the second density represents a quantity of second search cells determined by the server in unit area coverage, which are used to determine the at least one third terminal, wherein
an area of a second search cell is greater than an area of a first search cell.

4. The method according to claim 1, wherein duration of the second time period is greater than duration of the first time period.

5. The method according to claim 1, wherein
the sending, by the server, a search task to the at least one second terminal comprises sending, by the server, the search task to the at least one second terminal through transparent message transmission; and
the sending, by the server, the search task to the at least one third terminal comprises sending, by the server, the search task to the at least one third terminal through transparent message transmission.

6. The method according to claim 5, wherein the at least one second terminal comprises one or more second terminals that register a first service by using a first application but do not run the first application, wherein the first service is performing the search task sent by the server; and
the at least one third terminal comprises one or more third terminals that register the first service by using the first application but do not run the first application.

7. The method according to claim 1, wherein
before determining the at least one second terminal using the first frequency and the first density, the method further comprises: receiving, by the server, a location reported by the at least one second terminal; and
before determining the at least one third terminal using the second frequency and the second density, the method further comprises: receiving, by the server, a location reported by the at least one third terminal.

8. The method according to claim 1, further comprising:
if a quantity of second terminals determined by the server using the first frequency and the first density in the first search range is less than a threshold, prolonging, by the server, duration of the first time period.

9. The method according to claim 1, wherein determining the at least one second terminal using the first frequency and the first density comprises:
determining, by the server based on the first search range and the first density, a plurality of first search cells comprised in the first search range; and
determining, by the server, a preset quantity of second terminals from each first search cell based on the first frequency, and sending the search task to the determined preset quantity of second terminals.

10. The method according to claim 1, further comprising:
receiving, by the server, configuration information from the first terminal, wherein the configuration information is used by the server to configure the first search range, the first frequency, the first density, duration of the first time period, the second search range, the second frequency, the second density, and duration of the second time period.

11. A server, comprising:
one or more processors; and
one or more memories storing computer instructions, which when executed by the one or more processors, enable the server to perform operations:
receiving a search request from a first terminal, wherein the search request comprises a first location and an identifier of a Bluetooth device, and the first location is a location at which the first terminal loses a Bluetooth connection to the Bluetooth device, or the first location is a location entered by a user operating the first terminal;
determining, within a first time period, at least one second terminal to perform a search task in a first-stage search process using a first frequency and a first density in a first search range determined based on the first location, and sending a search task that carries the identifier to the at least one second terminal, so that the at least one second terminal enables Bluetooth to search for the Bluetooth device; and
if the server receives a message that is fed back by any one of the at least one second terminal indicating that the Bluetooth device is found, sending a second location of the second terminal that finds the Bluetooth device to the first terminal; or
if the server does not receive, within the first time period, a message that is fed back by any one of the at least one second terminal indicating that the Bluetooth device is found, determining, within a second time period after the first time period, at least one third terminal to perform a search task in a second-stage search process using a second frequency and a second density in a second search range, and sending the search task that carries the identifier to the at least one third terminal, so that the at least one third terminal enables Bluetooth to search for the Bluetooth device,
wherein the second search range is determined by the server based on the first location, the second search range is different from the first search range, the second frequency is less than the first frequency, and the second density is less than the first density.

12. The server according to claim 11, wherein the first search range is circular coverage that is determined by the server and whose center is the first location and radius is a first distance, or rectangular coverage that is determined by the server and whose center is the first location and side length is a distance twice the first distance; and the second search range is circular coverage that is determined by the server and whose center is the first location and radius is a second distance, or rectangular coverage that is determined by the server and whose center is the first location and side length is a distance twice the second distance, wherein the second distance is greater than the first distance.

13. The server according to claim 11, wherein the first density represents a quantity of first search cells determined by the server in unit area coverage, which are used to determine the at least one second terminal, the second density represents a quantity of second search cells determined by the server in unit area coverage, which are used to determine the at least one third terminal, wherein an area of a second search cell is greater than an area of a first search cell.

14. The server according to claim 11, wherein duration of the second time period is greater than duration of the first time period.

15. The server according to claim 11, wherein the sending, by the server, a search task to the at least one second terminal comprises sending, by the server, the search task to the at least one second terminal through transparent message transmission; and the sending, by the server, the search task to the at least one third terminal comprises sending, by the server, the search task to the at least one third terminal through transparent message transmission.

16. The server according to claim 15, wherein the at least one second terminal comprises one or more second terminals that register a first service by using a first application but do not run the first application, wherein the first service is performing the search task sent by the server; and the at least one third terminal comprises one or more third terminals that register the first service by using the first application but do not run the first application.

17. The server according to claim 11, wherein the operations further comprise:

before the server determines the at least one second terminal by using the first frequency and the first density in the first search range determined based on the first location, receiving a location reported by the at least one second terminal; and before the server determines the at least one third terminal by using the second frequency and the second density in the second search range within the second time period, receiving a location reported by the at least one third terminal.

18. The server according to claim 11, wherein the operations further comprise:

if a quantity of second terminals determined by the server using the first frequency and the first density in the first search range is less than a threshold, prolonging duration of the first time period.

19. The server according to claim 11, wherein determining the at least one second terminal using the first frequency and the first density, and sending the search task to the at least one second terminal comprise:

determining, by the server based on the first search range and the first density, a plurality of search cells comprised in the first search range; and determining, by the server, a preset quantity of second terminals from each search cell based on the first frequency, and sending the search task to the determined preset quantity of second terminals.

20. The server according to claim 11, wherein the operations further comprise:

receiving configuration information from the first terminal, wherein the configuration information is used by the server to configure the first search range, the first frequency, the first density, duration of the first time period, the second search range, the second frequency, the second density, and duration of the second time period.

* * * * *